(12) United States Patent
Horade et al.

(10) Patent No.: US 10,300,704 B2
(45) Date of Patent: May 28, 2019

(54) INKJET RECORDING APPARATUS CAPABLE OF INITIALIZE INK QUANTITY INFORMATION BASED ON QUANTITY OF INK INJECTED INTO INK CHAMBER

(71) Applicant: BROTHER KOGYO KABUSHIKI KAISHA, Nagoya-shi, Aichi-ken (JP)

(72) Inventors: Kenta Horade, Tokai (JP); Mana Honoki, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/875,030

(22) Filed: Jan. 19, 2018

(65) Prior Publication Data

US 2018/0207942 A1 Jul. 26, 2018

(30) Foreign Application Priority Data

Jan. 20, 2017 (JP) ................... 2017-008432

(51) Int. Cl.
*B41J 2/175* (2006.01)
*H04N 1/00* (2006.01)

(52) U.S. Cl.
CPC ...... *B41J 2/17566* (2013.01); *H04N 1/00037* (2013.01); *H04N 1/00087* (2013.01); *H04N 2201/0094* (2013.01)

(58) Field of Classification Search
CPC ............. B41J 2/17566; H04N 1/00037; H04N 1/00087; H04N 2201/0094
See application file for complete search history.

(56) References Cited

U.S. PATENT DOCUMENTS

2010/0026741 A1 2/2010 Gold et al.
2016/0059571 A1 3/2016 Kobayashi
(Continued)

FOREIGN PATENT DOCUMENTS

JP 2012-201101 A 10/2012
JP 2013-152685 A 8/2013
(Continued)

OTHER PUBLICATIONS

IP.com search (Year: 2018).*
(Continued)

*Primary Examiner* — Lisa Solomon
(74) *Attorney, Agent, or Firm* — Merchant & Gould P.C.

(57) ABSTRACT

An inkjet recording apparatus includes: a tank; a recording head; a memory: a display; an operation interface; and a controller. The memory stores an ink quantity information including: a first threshold value; and a count value. The controller is configured to perform: an inference process to infer whether ink has been injected into the ink chamber through the inlet; an inquiry process to inquire whether ink has been injected into the ink chamber up to a maximum storage quantity thereof; a first initialization process to set the ink quantity information to a first initial value with which a first difference between the first threshold value and the count value becomes maximum within the prescribed range; and a second initialization process to set the ink quantity information to a second initial value with which the first difference is smaller than the first difference with the first initial value.

14 Claims, 12 Drawing Sheets

(56) References Cited

U.S. PATENT DOCUMENTS

2016/0207337 A1  7/2016  Honoki et al.
2016/0207339 A1  7/2016  Honoki

FOREIGN PATENT DOCUMENTS

| JP | 2016-132218 A | 7/2016 | |
|---|---|---|---|
| JP | 2016-132220 A | 7/2016 | |
| JP | 2016-132221 A | 7/2016 | |
| WO | WO-2014034109 A1 * | 3/2014 | .......... B41J 2/17509 |

OTHER PUBLICATIONS

Office Action issued in related U.S. Appl. No. 15/875,049, dated Oct. 4, 2018.
Related U.S. Appl. No. 15/874,980, filed Jan. 19, 2018.
Related U.S. Appl. No. 15/874,959, filed Jan. 19, 2018.
Related U.S. Appl. No. 15/875,049, filed Jan. 19, 2018.
Related U.S. Appl. No. 15/875,073, filed Jan. 19, 2018.
Office Action (Notice of Allowance) issued in related U.S. Appl. No. 15/875,049, dated Jan. 23, 2019.
Office Action (Notice of Allowance) issued in related U.S. Appl. No. 15/875,073, dated Mar. 11, 2019.

* cited by examiner

INKJET RECORDING APPARATUS CAPABLE OF INITIALIZE INK QUANTITY INFORMATION BASED ON QUANTITY OF INK INJECTED INTO INK CHAMBER

CROSS REFERENCE TO RELATED APPLICATION

This application claims priority from Japanese Patent Application No. 2017-008432 filed Jan. 20, 2017. The entire content of the priority application is incorporated herein by reference.

TECHNICAL FIELD

The present disclosure relates to an inkjet recording apparatus configured to record an image on a sheet.

BACKGROUND

Japanese patent application publication No. 2016-132221 describes one example of an inkjet recording apparatus provided with refillable ink tanks. A user injects ink from an ink bottle into an ink chamber of the ink tank through an inlet formed in the ink tank. The conventional inkjet recording apparatus also prompts the user to indicate whether the ink chamber has been refilled with ink when inferring that a refilling process has been performed. In response to the user operation to indicate that the ink chamber has been refilled, the conventional inkjet recording apparatus initializes a count value indicative of a residual ink quantity.

SUMMARY

However, with the conventional inkjet recording apparatus described above, there is no guarantee that the user has refilled the ink chamber with ink to its maximum capacity. In other words, if the apparatus initializes the count value for the residual ink quantity based on the assumption that the user has refilled the ink chamber with ink to its maximum level, the estimated ink quantity indicated by this count value may be greater than the actual quantity of ink stored in the ink chamber.

If the conventional inkjet recording apparatus continues to record images in this condition, eventually the recording section will attempt to eject ink while very little ink remains in the ink chamber. If the recording section continues to eject ink after an ink level has fallen below an outlet of the ink chamber, air will be introduced into a channel leading from the ink chamber to the recording section (hereinafter referred to as "air introduction"), adversely affecting image recording quality.

In view of the foregoing, it is an object of the disclosure to provide an inkjet recording apparatus capable of setting ink quantity information to an initial value corresponding to the quantity of ink injected into an ink chamber.

In order to attain the above and other objects, according to one aspect, the disclosure provides an inkjet recording apparatus including: a tank; a recording head; a memory: a display; an operation interface; and a controller. The tank has a set of an ink chamber and an inlet. The ink chamber is configured to store ink therein. Ink is injected into the ink chamber through the inlet. The recording head is configured to eject the ink stored in the ink chamber to record an image on a sheet. The memory is configured to store an ink quantity information. The ink quantity information including: a first threshold value; and a count value updated in a direction approaching the first threshold value to decrease a first difference between the first threshold value and the count value in accordance with ejection of the ink from the recording head. The first difference is obtained by subtracting one of the first threshold value and the count value from the other of the first threshold value and the count value. The first difference corresponds to a quantity of the ink stored in the ink chamber and is variable within a prescribed range. The display is configured to display a screen. The operation interface is configured to receive a user operation. The controller is configured to control the recording head and the display. The controller is configured to: perform an inference process to infer whether ink has been injected into the ink chamber through the inlet; perform, in response to the inference that ink has been injected into the ink chamber in the inference process, an inquiry process to display an inquiry screen on the display and to receive one of a plurality of operations through the operation interface, the plurality of operations including a first operation and a second operation, the inquiry screen inquiring whether ink has been injected into the ink chamber up to a maximum storage quantity thereof; perform, in response to the receipt of the first operation in the inquiry process, a first initialization process to set the ink quantity information to a first initial value with which the first difference becomes maximum within the prescribed range; and perform, in response to the receipt of the second operation in the inquiry process, a second initialization process to set the ink quantity information to a second initial value with which the first difference is smaller than the first difference with the first initial value.

According to another aspect, the disclosure provides an inkjet recording apparatus including: a tank; a recording head; a memory; a display; an operation interface; and a controller. The tank has a set of an ink chamber and an inlet. The ink chamber is configured to store ink therein. Ink is injected into the ink chamber through the inlet. The recording head is configured to eject the ink stored in the ink chamber to record an image on a sheet. The memory is configured to store an ink quantity information. The ink quantity information includes: a first threshold value; and a count value updated in a direction approaching the first threshold value to decrease a first difference between the first threshold value and the count value in accordance with ejection of the ink from the recording head. The first difference is obtained by subtracting one of the first threshold value and the count value from the other of the first threshold value and the count value. The first difference corresponds to a quantity of the ink stored in the ink chamber and is variable within a prescribed range. The display is configured to display a screen. The operation interface is configured to receive a user operation. The controller is configured to control the recording head and the display. The controller is configured: to perform an inference process to infer whether ink has been injected into the ink chamber through the inlet; to perform, in response to the inference that ink has been injected into the ink chamber in the inference process, an inquiry process to display an inquiry screen on the display and to receive one of a first operation, a second operation, and a third operation through the operation interface, the inquiry screen inquiring whether ink has been injected into the ink chamber up to a maximum storage quantity thereof; to perform, in response to the receipt of the first operation in the inquiry process, a first initialization process to set the ink quantity information to a first initial value with which the first difference becomes maximum within the prescribed range; to perform, in response to the receipt of the second operation in the inquiry process, a second initialization process to set the ink quantity information to a second initial value with which the first difference is smaller than the first difference with the first initial value; and not to update, in response to the receipt of the third operation in the inquiry process, the ink quantity information.

According to still another aspect, the disclosure provides an inkjet recording apparatus including: a tank; a recording head; a memory; a display; an operation interface; and a controller. The tank has a set of an ink chamber and an inlet. The ink chamber is configured to store ink therein. Ink is injected into the ink chamber through the inlet. The recording head is configured to eject the ink stored in the ink chamber to record an image on a sheet. The memory is configured to store an ink quantity information. The ink quantity information includes: a first threshold value; and a count value updated in a direction approaching the first threshold value to decrease a first difference between the first threshold value and the count value in accordance with ejection of the ink from the recording head. The first difference is obtained by subtracting one of the first threshold value and the count value from the other of the first threshold value and the count value. The first difference corresponds to a quantity of the ink stored in the ink chamber and is variable within a prescribed range. The display is configured to display a screen. The operation interface is configured to receive a user operation. The controller is configured to control the recording head and the display. The controller is configured to: perform an inference process to infer whether ink has been injected into the ink chamber through the inlet; perform, in response to the inference that ink has been injected into the ink chamber in the inference process, an inquiry process to display an inquiry screen on the display and to receive one of a first operation, a second operation, and a third operation through the operation interface, the inquiry screen inquiring whether ink has been injected into the ink chamber up to a maximum storage quantity thereof; perform, in response to the receipt of the first operation in the inquiry process, a first initialization process to set the ink quantity information to a first initial value with which the first difference becomes maximum within the prescribed range; perform, in response to the receipt of the second operation in the inquiry process, a second initialization process to set the ink quantity information to a second initial value with which the first difference is smaller than the first difference with the first initial value; and perform, in response to the receipt of the third operation in the inquiry process, a third initialization process to set the ink quantity information to a third initial value with which the first difference is smaller than the first difference with the second initial value.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Figure 1A:
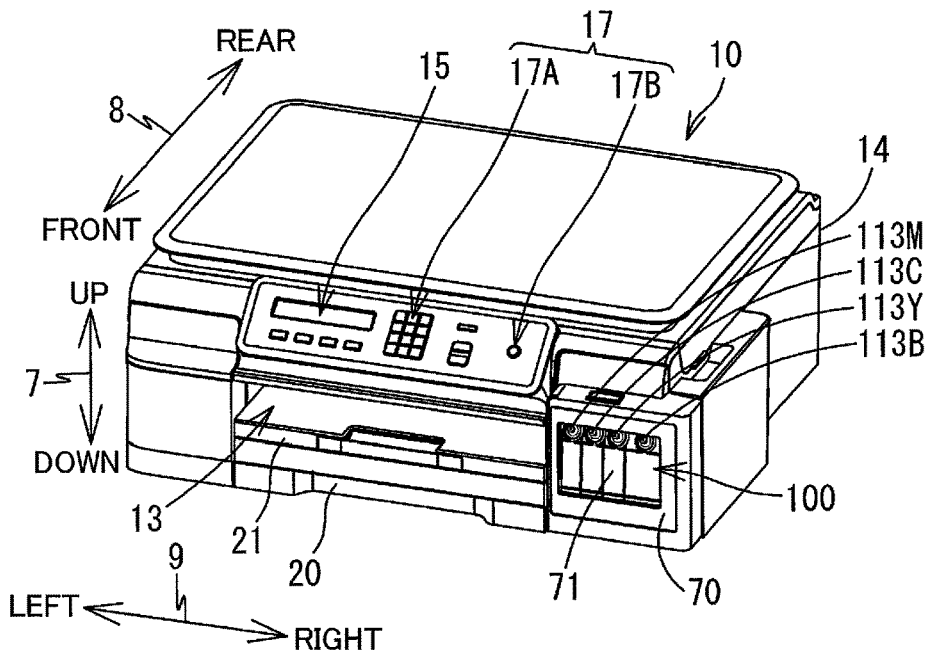
FIG. 1A is a perspective view of a multifunction peripheral (MFP) 10 according to one embodiment, in which a cover 70 of the MFP 10 is closed.

A multifunction peripheral (hereinafter abbreviated as "MFP") 10 as an example of an inkjet recording apparatus according to one embodiment will be described with reference to the accompanying drawings, wherein like parts and components are designated by the same reference numerals to avoid duplicating description.

Note that the embodiment described below is merely an example of the disclosure and may be modified in many ways without departing from the scope of the disclosure.

In the following description, an up-down direction 7 is defined based on an orientation of the MFP 10 when the MFP 10 is ready to use (hereinafter referred to as an "operable posture"); a front-rear direction 8 is defined so that a side of the MFP 10 in which a discharge opening 13 is formed is a front side; and a left-right direction 9 is defined based on a perspective of an user facing the front side of the MFP 10.

<Overall Structure of MFP 10>

As illustrated in FIGS. 1A, 1B, 2, and 5, the MFP 10 includes a feed tray 20, a discharge tray 21, a conveying section 23, a recording section 24, and an ink tank 100. The ink tank 100 is an example of a tank. These components of the MFP 10 are accommodated in a casing 14 having a general rectangular parallelepiped shape. The MFP 10 has a printer function for recording images on sheets according to an inkjet recording method. The MFP 10 may also have other functions, such as a facsimile function and a scanning function. The MFP 10 is an example of an inkjet recording apparatus.

<Feed Tray 20 and Discharge Tray 21>

Figure 1B:
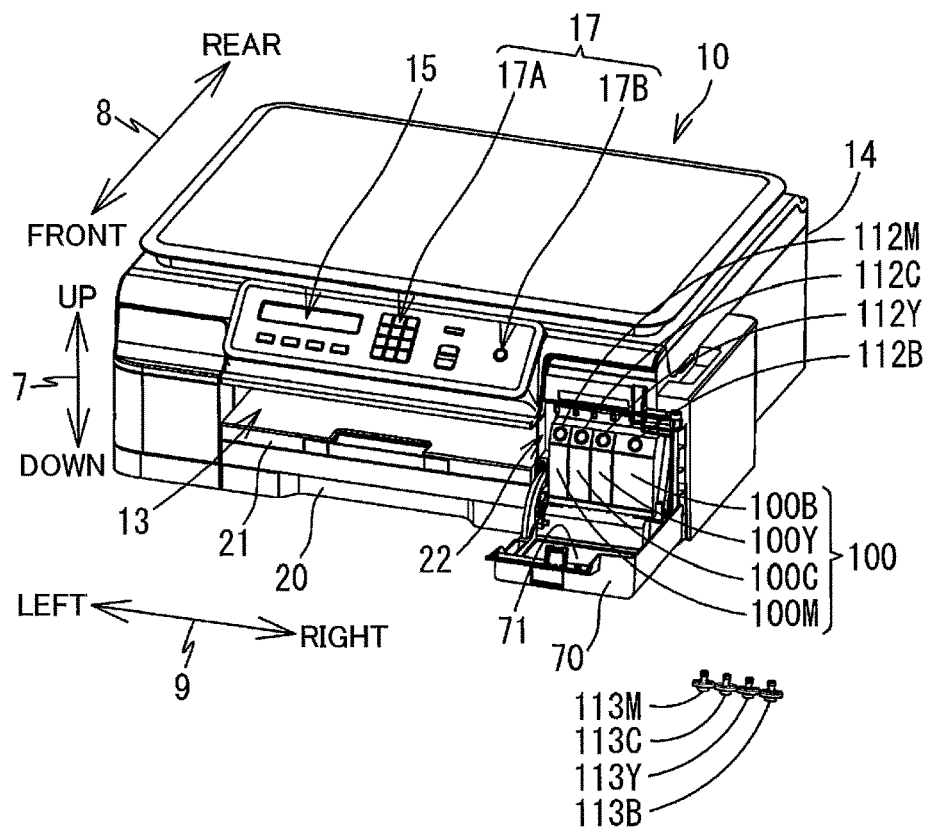
FIG. 1B is a perspective view of the MFP 10 according to the embodiment, in which the cover 70 is open.

As illustrated in FIGS. 1A and 1B, the discharge opening 13 is formed in a front surface of the casing 14 at its center region in the left-right direction 9. The feed tray 20 is inserted into and removed from the casing 14 through the discharge opening 13 in the front-rear direction 8. The feed tray 20 can support a plurality of sheets in a stacked state.

The discharge tray 21 is disposed above the feed tray 20. The discharge tray 21 is inserted into and removed from the casing 14 together with the feed tray 20. The discharge tray 21 supports sheets discharged by the conveying section 23.

<Conveying Section 23 and Recording Section 24>

The conveying section 23 is configured to convey the sheets supported on the feed tray 20 along a conveying path that leads to the discharge tray 21 while passing through a position in which the sheets confront the recording section 24. The conveying section 23 includes a plurality of rollers and the like that rotate while in contact with the sheets, for example. The recording section 24 is configured to record images on sheets conveyed by the conveying section 23 by ejecting ink stored in the ink tank 100. The recording section 24 includes a carriage that is movable in a main scanning direction crossing a direction in which the sheets are conveyed, and a recording head that is mounted on the carriage and configured to eject ink from nozzles, for example. The recording section 24 is an example of a recording head.

Figure 2:
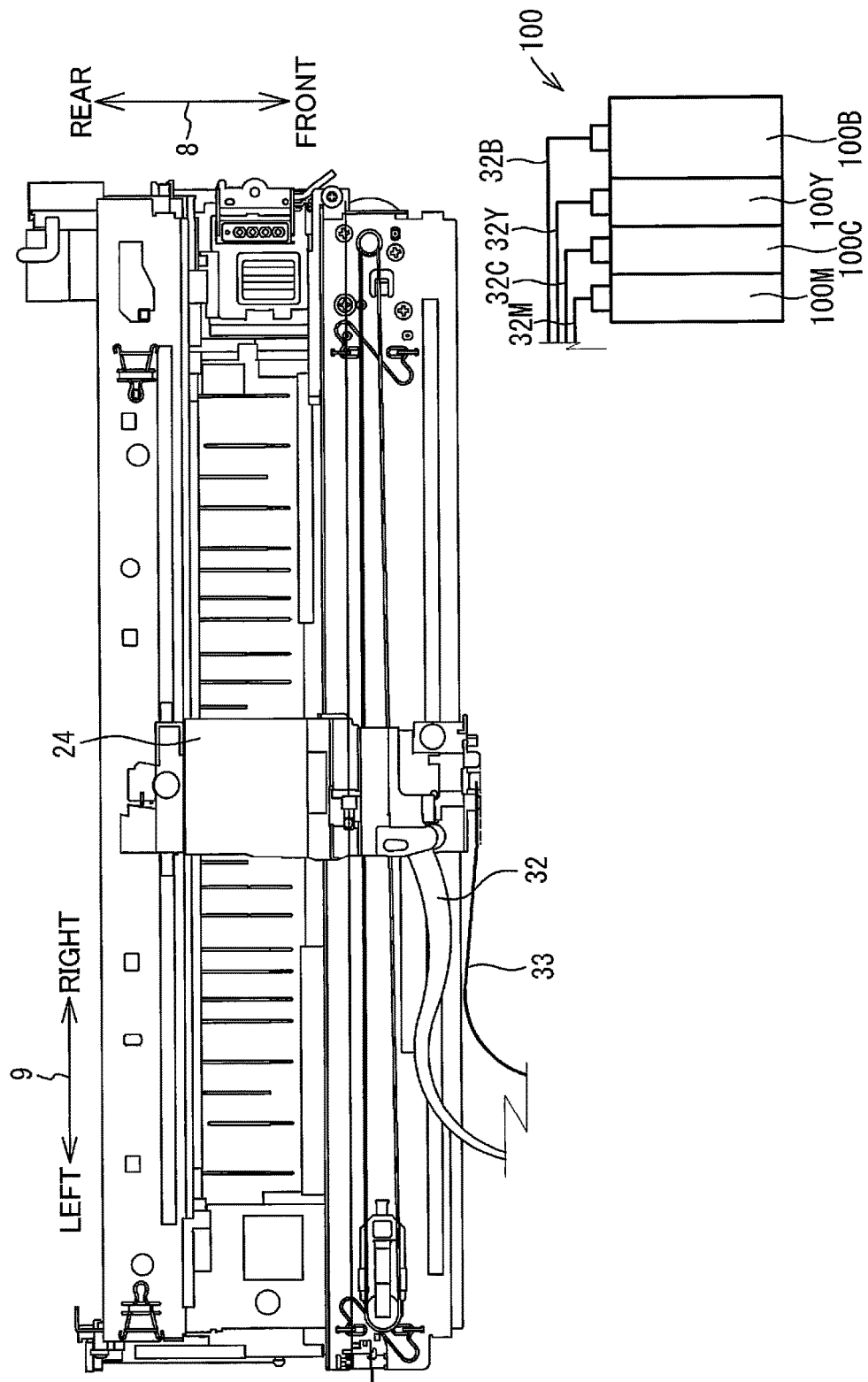
FIG. 2 is a plan view of a recording section 24 and an ink tank 100 of the MFP 10 according to the embodiment.

As illustrated in FIG. 2, ink tubes 32 and a flexible flat cable 33 are connected to the recording section 24. The ink tubes 32 are configured to supply ink stored in the ink tank 100 to the recording section 24. More specifically, the ink tubes 32 include four ink tubes 32B, 32Y, 32C, and 32M (hereinafter collectively referred to as the ink tubes 32) for allowing ink of four colors, i.e., black, magenta, cyan, and yellow, to flow therethrough, respectively. The ink tubes 32 are bundled together, with one end of the ink tubes 32 connected to and extending from the ink tank 100 and the other end connected to the recording section 24. The flexible flat cable 33 is configured to transmit control signals outputted from a controller 130 (see FIG. 5) to the recording section 24.

<Ink Tank 100>

As illustrated in FIGS. 1A and 1B, the ink tank 100 is installed in an interior space of the casing 14 at its right-front portion. That is, the ink tank 100 is fixed in the MFP 10 and cannot easily be removed from the casing 14. Here, the phrase "cannot easily be removed" is intended to mean that a general user cannot simply remove the ink tank 100 from the MFP 10 under normal operating conditions, for example. There is no need to install the ink tank 100 in such a way that makes them impossible to remove from the MFP 10.

The ink tank 100 is configured to store ink to be supplied to the recording section 24. As illustrated in FIG. 1B, the ink tank 100 includes four tanks 100B, 100Y, 100C, and 100M. Each of the tanks 100B, 100Y, 100C, and 100M stores ink of a different color. Specifically, the tank 100B stores black ink, the tank 100Y stores yellow ink, the tank 100C stores cyan ink, and the tank 100M stores magenta ink. However, the number of tanks 100B, 100Y, 100C, and 100M and the colors of ink stored therein are not limited to the above example.

The four tanks 100B, 100Y, 100C, and 100M are disposed in a row along the left-right direction 9. Of the four tanks 100B, 100Y, 100C, and 100M, the tank 100B is disposed farthest to the right while the tank 100M is disposed farthest to the left. The tank 100B has a width in the left-right direction 9 greater than that of the other tanks 100Y, 100C, and 100M. The tank 100B also has an ink chamber 111B (described later) with a capacity greater than that of ink chambers 111Y, 111C, and 111M of the other tanks 100Y, 100C, and 100M. However, arrangement of the tanks 100B, 100Y, 100C, and 100M, sizes of the tanks 100B, 100Y, 100C, and 100M, and capacities of the ink chambers 111 are not limited to the relationships described in the above example.

Figure 3:
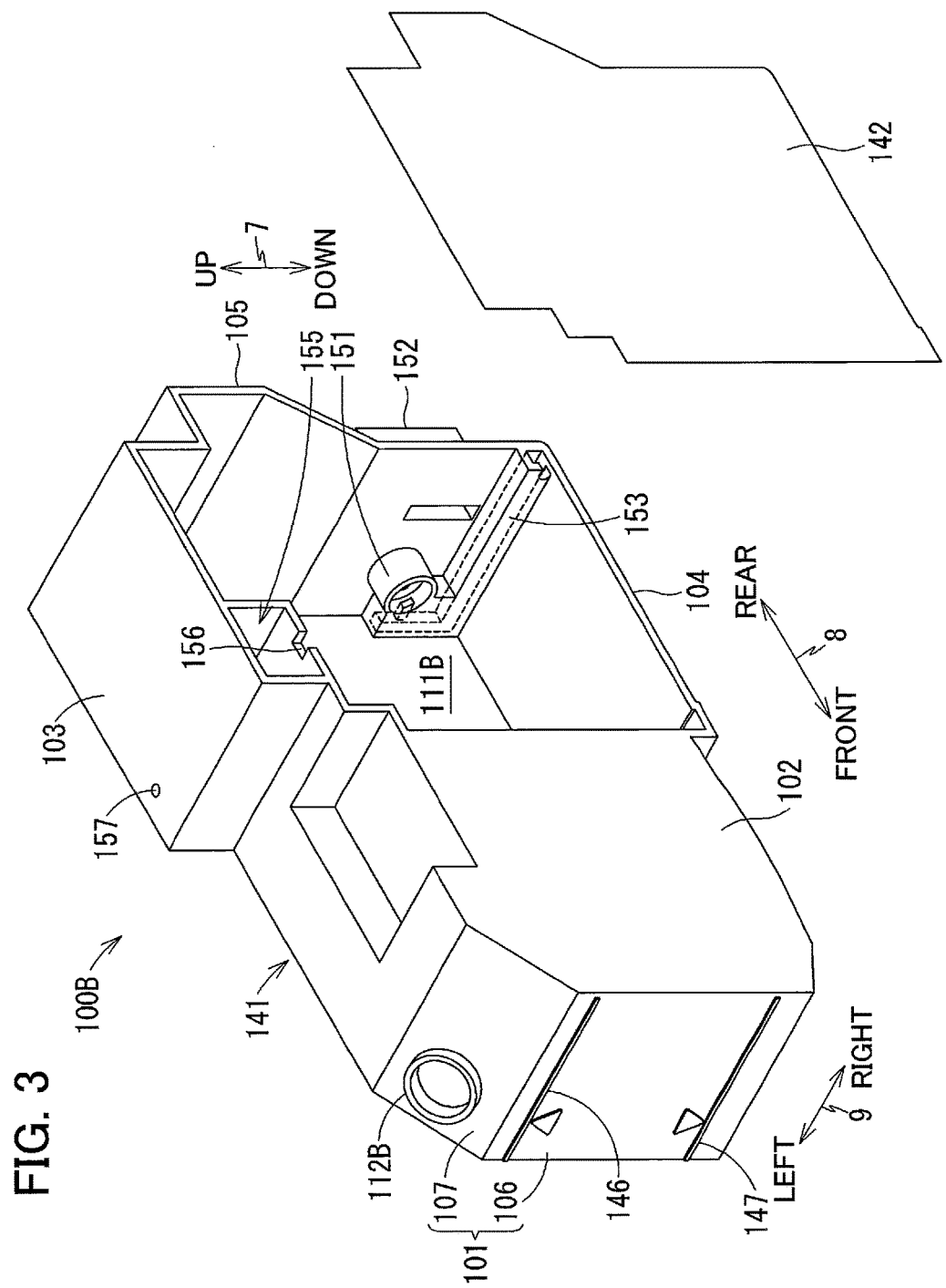
FIG. 3 is a perspective view of a tank 100B constituting the ink tank 100 as viewed from a front side thereof according to the embodiment.
Figure 4:
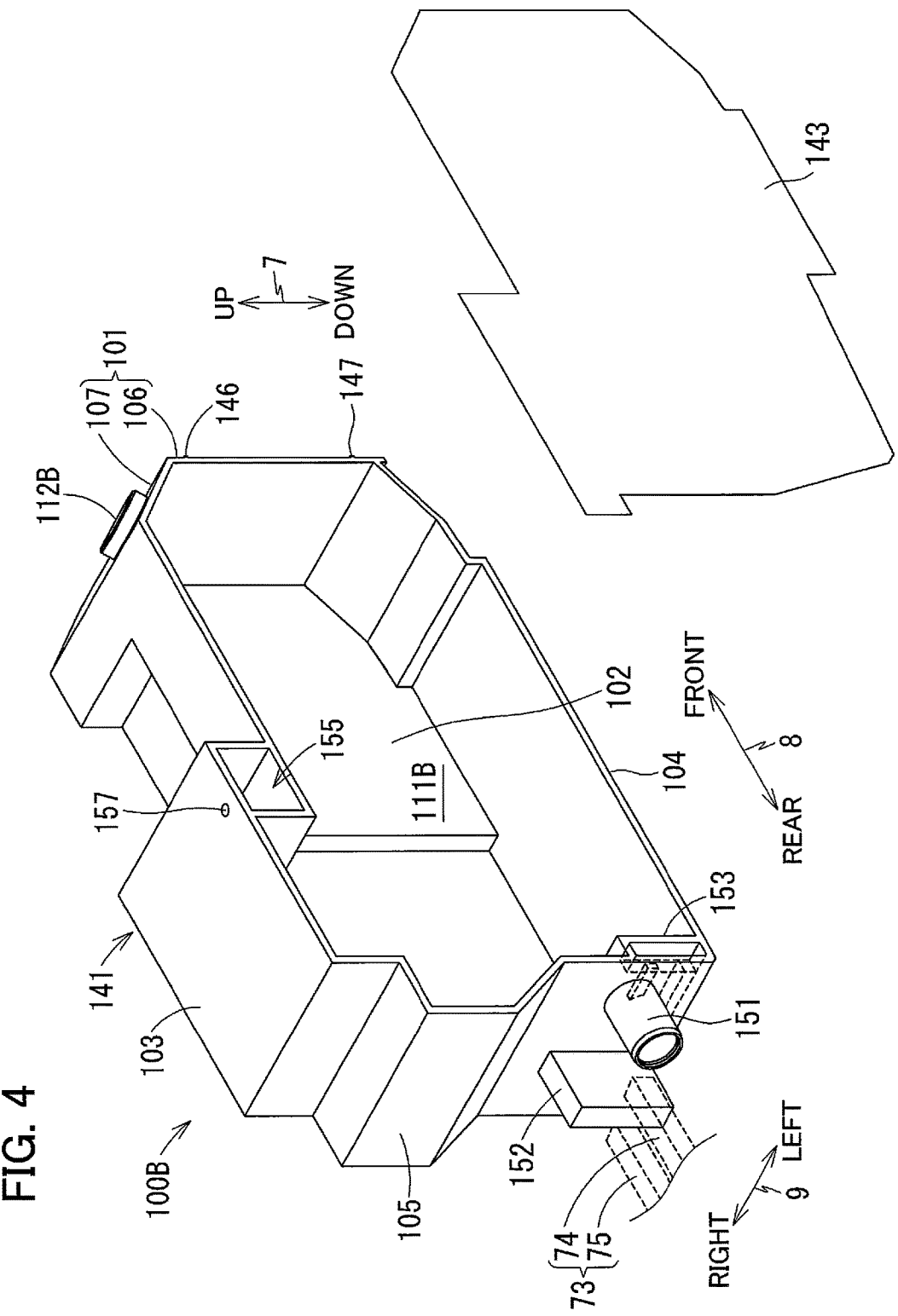
FIG. 4 is a perspective view of the tank 100B as viewed from a rear side thereof according to the embodiment.

As illustrated in FIGS. 3 and 4, the tank 100B includes a frame 141, and two films 142 and 143. The frame 141 has a general rectangular parallelepiped shape that is flattened in the left-right direction 9 such that its dimensions in the up-down direction 7 and the front-rear direction 8 are greater than its dimension in the left-right direction 9. The frame 141 is formed of a resin (polypropylene, for example) that is sufficiently translucent to allow visual recognition of ink stored in the ink chamber 111B from outside the tank 100B. The frame 141 may be integrally molded through injection molding of a resin material, for example.

The frame 141 includes a front wall 101, a right wall 102, a top wall 103, a bottom wall 104, and a rear wall 105. A left end and part of a right end of the frame 141 are open. The films 142 and 143 are melt-bonded to the frame 141 so as to seal the openings in the left and right ends of the frame 141. The interior space of the tank 100B defined by the front wall 101, the right wall 102, the top wall 103, the bottom wall 104, the rear wall 105, and the films 142 and 143 constitutes the ink chamber 111B in which the ink is stored. Note that the ink chamber 111B may instead be defined by inner walls (not illustrated) positioned inside the outer walls 101-105 of the frame 141. Further, the ink chamber 111B may be divided into a plurality of small regions by partitioning walls (not illustrated).

The front wall 101 is configured of a vertical wall 106, and a sloped wall 107. The vertical wall 106 expands in the up-down direction 7 and the left-right direction 9. The sloped wall 107 is connected between a top edge of the vertical wall 106 and a front edge of the top wall 103. The sloped wall 107 slopes relative to the up-down direction 7 and the front-rear direction 8. An inlet 112B is formed in the sloped wall 107. Ink is injected, or poured, into the ink chamber 111B through the inlet 112B. The inlet 112B penetrates the sloped wall 107 in a thickness direction thereof, allowing the ink chamber 111B to be in communication with an exterior of the tank 100B.

The inlet 112B is closed with a cap 113B. As illustrated in FIG. 1A, the cap 113B attached to the sloped wall 107 intimately contacts a surface of the sloped wall 107 defining a peripheral edge of the inlet 112B to seal the inlet 112B. As illustrated in FIG. 1B, on the other hand, the cap 113B is removed from the sloped wall 107 to open the inlet 112B. Here, the cap 113B can be attached to and removed from the sloped wall 107 while a cover 70 (described later) is in its exposing position. By removing the cap 113B from the inlet 112B, the user can inject ink into the ink chamber 111B through the inlet 112B.

As illustrated in FIGS. 3 and 4, a first line 146 and a second line 147 are provided on an outer surface of the vertical wall 106. The first line 146 and the second line 147 both extend in the left-right direction 9. When the MFP 10 is in its operable posture, the first line 146 is positioned approximately at a height in the up-down direction 7 the same as a level of ink in the ink chamber 111B when the ink chamber 111B stores ink of a preset maximum storage quantity. The maximum storage quantity corresponds to the quantity of ink stored in a single ink bottle (not illustrated), for example. When the MFP 10 is in its operable posture, the second line 147 is positioned lower in the up-down direction 7 than the first line 146 and higher in the up-down direction 7 than a detection position described later.

An ink supply portion 151 is provided at the rear wall 105. The ink supply portion 151 has a cylindrical shape with a hollow interior space. The ink supply portion 151 protrudes rearward from an outer surface of the rear wall 105. A distal end (i.e. protruding end) of the ink supply portion 151 is open. The interior space of the ink supply portion 151 is in communication with the ink chamber 111B through an ink channel 153 described later. By connecting the ink tube 32B to the ink supply portion 151 so that one end portion of the ink tube 32B is fitted onto an outer surface of the ink supply portion 151, ink stored in the ink chamber 111B is supplied to the ink tube 32B through the ink supply portion 151.

An ink detection portion 152 is provided at the rear wall 105. The ink detection portion 152 protrudes rearward from the outer surface of the rear wall 105. The ink detection portion 152 has a box shape with a hollow interior space. The ink detection portion 152 is formed of a light transmissive material that allows transmission of light irradiated from a light-emitting portion 74 described later. The interior space of the ink detection portion 152 is in communication with the ink chamber 111B. Hence, ink is present in the interior space of the ink detection portion 152 when the level of ink in the ink chamber 111B is higher than a lower edge of the ink detection portion 152. On the other hand, ink is not present in the interior space of the ink detection portion 152 when the level of ink in the ink chamber 111B is lower than the lower edge of the ink detection portion 152.

An ink channel 153 is a long narrow path for supplying ink stored in the ink chamber 111B to the ink supply portion 151. The ink channel 153 has one end that communicates with the ink chamber 111B at a position in contact with an inner surface of the bottom wall 104, and the other end that communicates with the interior space of the ink supply portion 151. More specifically, the ink channel 153 extends leftward from its communicating position with the ink chamber 111B, and then extends upward from the left end of the tank 100B, and lastly extends rightward from a position of height equal to the ink supply portion 151 in order to communicate with the interior space of the ink supply portion 151.

An air communication portion 155 is also provided in the tank 100B. The air communication portion 155 is an air passage that allows the ink chamber 111B to communicate with external air. The air communication portion 155 is provided at a position higher in the up-down direction 7 than the inlet 112B. The air communication portion 155 has one end that communicates with the ink chamber 111B through a notch 156 formed in a bottom wall of the air communication portion 155, and the other end that communicates with an exterior of the tank 100B through a through-hole 157 penetrating the top wall 103. A labyrinth channel, a semi-permeable membrane, or the like may be provided inside the air communication portion 155.

<Residual Ink Sensor 73>

Figure 5:
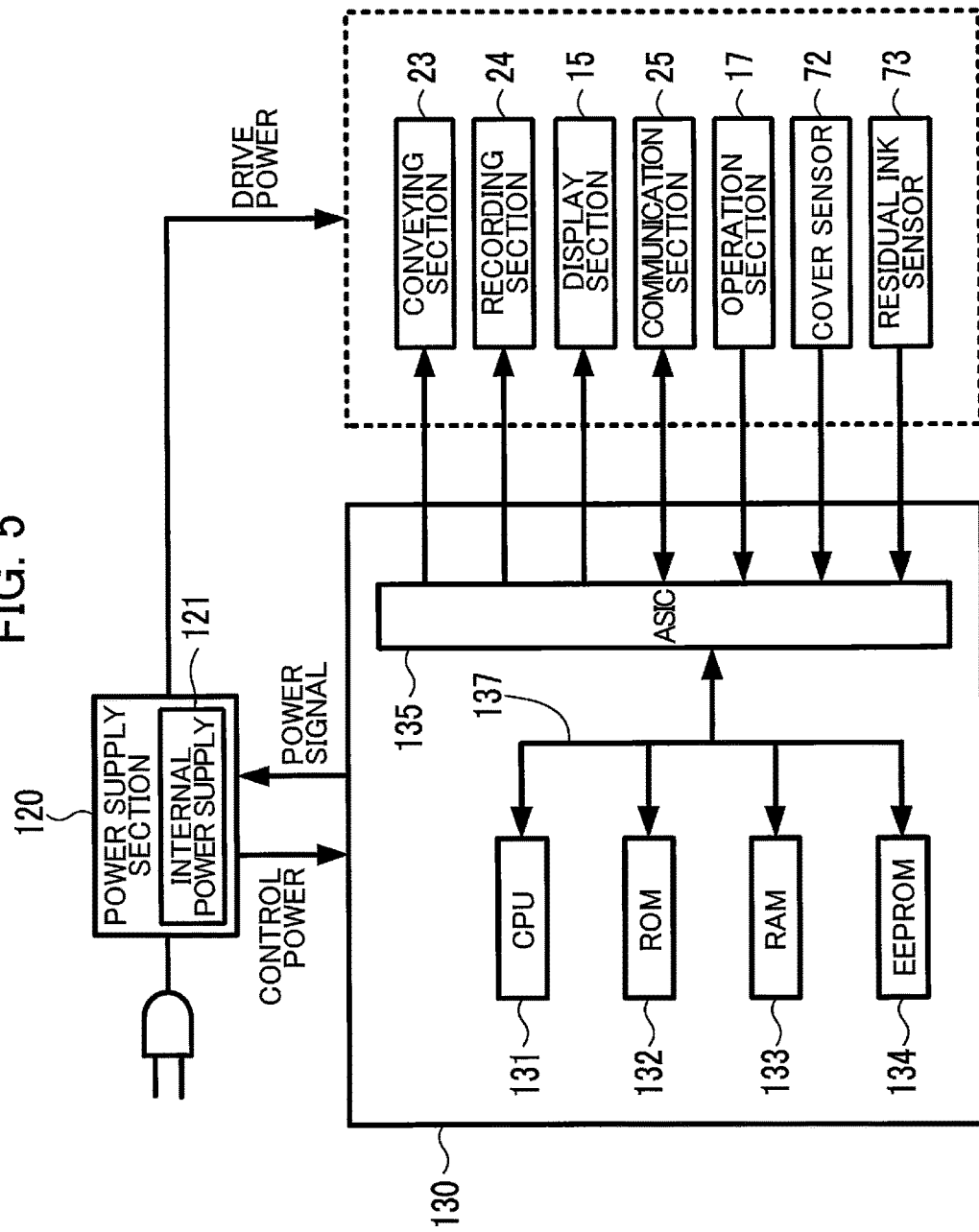
FIG. 5 is a functional block diagram of the MFP 10 according to the embodiment.

As illustrated in FIGS. 4 and 5, the MFP 10 also includes a residual ink sensor 73. The residual ink sensor 73 has the light-emitting portion 74 and a light-receiving portion 75. The light-emitting portion 74 and the light-receiving portion 75 are disposed on opposite sides of the ink detection portion 152 so as to face each other in the left-right direction 9. The light-emitting portion 74 is configured to output light (visible light or infrared light, for example) toward the light-receiving portion 75. The light can pass through walls constituting the ink detection portion 152 but not through black ink. The light-receiving portion 75 is configured to output a residual ink signal to the controller 130 based on whether the light-receiving portion 75 has received light outputted from the light-emitting portion 74 after the light passes through the ink detection portion 152. In other words, the residual ink sensor 73 is configured to output a residual ink signal to the controller 130 corresponding to the quantity of ink stored in the ink chamber 111B.

The residual ink sensor 73 according to the present embodiment is configured to output either a first residual ink signal or a second residual ink signal to the controller 130. The residual ink sensor 73 outputs the first residual ink signal in response to presence of ink at the detection position in the ink detection portion 152. On the other hand, the residual ink sensor 73 outputs the second residual ink signal in response to non-presence of ink at the detection position in the ink detection portion 152. In the present embodiment, the first residual ink signal outputted from the residual ink sensor 73 has a signal level of 0 V, while the second residual ink signal outputted from the residual ink sensor 73 has a signal level of 3.3 V. Hence, the phrase "the residual ink sensor 73 outputs a residual ink signal" includes cases in which the signal level is 0 V. However, combination of signal levels is not limited to the above example. Combination of position signals of a cover sensor 72 (described later) is also not limited to the example in the present embodiment.

The detection position is a position within the interior space of the ink detection portion 152 having a height in the up-down direction 7 the same as those of the light-emitting portion 74 and the light-receiving portion 75. The detection position in the up-down direction 7 is lower than the second line 147 and slightly higher than the interior space of the ink supply portion 151 when the MFP 10 is in its operable posture. Hence, the interior space of the ink supply portion 151 is filled with ink when the level of ink in the ink chamber 111B is aligned with the detection position. However, when the level of ink in the ink chamber 111B drops below the detection position, air introduced into the ink chamber 111B through the air communication portion 155 may enter the interior space of the ink supply portion 151. A difference in the up-down direction 7 between the detection position and the interior space in the ink supply portion 151 is preliminarily set based on an estimated quantity of ink required for recording an image on one sheet, for example.

Hence, the residual ink signal outputted from the residual ink sensor 73 switches from the first residual ink signal to the second residual ink signal at a timing in which the level of ink in the ink chamber 111B drops below the detection position. In the following description, a state of the ink chamber 111B when the residual ink sensor 73 outputs the second residual ink signal will be referred to as a "hard-empty" state. In other words, the term "hard-empty state" indicates a state of the ink chamber 111B just prior to air entering the interior space of the ink supply portion 151, for example. "Hard-empty" is an example of the quantity of ink stored in the ink chamber 111B being less than a residual ink threshold. The residual ink threshold corresponds to the quantity of ink stored in the ink chamber 111B when the level of ink in the ink chamber 111B is at the detection position, for example.

The tanks 100Y, 100C, and 100M may have a basic structure the same as that of the tank 100B. However, the tanks 100Y, 100C, and 100M are not provided with the ink detection portion 152. That is, the controller 130 cannot detect residual ink quantities in the corresponding ink chambers 111Y, 111C, and 111M using residual ink sensors 73. Hereinafter, the ink chambers 111B, 111Y, 111C, and 111M will be collectively referred to as the "ink chambers 111," the inlets 112B, 112Y, 112C, and 112M will be collectively referred to as the "inlets 112," and the caps 113B, 113Y, 113C, and 113M will be collectively referred to as the "caps 113."

<Cover 70>

As illustrated in FIG. 1B, an opening 22 is formed in the front surface of the casing 14 at a right end thereof. The front surface of the ink tank 100 is exposed to an outside of the MFP 10 through the opening 22. The MFP 10 has a cover 70 that is pivotally movable between a covering position (a position illustrated in FIG. 1A) for covering the opening 22, and an exposing position (a position illustrated in FIG. 1B) for exposing the opening 22. The cover 70 is supported to the casing 14 at a bottom edge portion of the casing 14 so as to be pivotally movable about a pivot axis extending along the left-right direction 9.

In the covering position, the cover 70 covers all of the inlets 112B, 112Y, 112C, and 112M and restricts injection of ink into all of the ink chambers 111B, 111Y, 111C, and 111M through the inlets 112B, 112Y, 112C, and 112M. Here, the cover 70 in the covering position may be configured to cover the inlets 112 in their entirety or to cover just a portion of the inlets 112. When the cover 70 is in the exposing position, all of the inlets 112B, 112Y, 112C, and 112M are exposed outside the MFP 10, allowing ink to be injected into all of the ink chambers 111B, 111Y, 111C, and 111M.

The user performs the following series of steps for filling the ink chambers 111 with ink. First, the user moves the cover 70 from the covering position to the exposing position and removes the cap 113 from the inlet 112 corresponding to the color of ink to be refilled. Next, the user inserts a tip of the ink bottle into the opened inlet 112 and injects all of ink in the ink bottle into the ink chamber 111. After the ink chamber 111 has been refilled, the user reattaches the cap 113 to the corresponding inlet 112 and moves the cover 70 back to the covering position.

The cover 70 has a transparent window 71. The transparent window 71 confronts the front walls 101 of the tanks 100B, 100Y, 100C, and 100M when the cover 70 is in the covering position. With this configuration, the user can visually recognize the residual ink quantity of ink in the ink chambers 111 through the front walls 101, regardless of whether the cover 70 is in the covering position or the exposing position. On the other hand, the transparent window 71 may be omitted from the cover 70. In this case, the user must move the cover 70 to the exposing position in order to check the levels of ink in the ink chambers 111.

<Cover Sensor 72>

As illustrated in FIG. 5, the MFP 10 also includes a cover sensor 72. The cover sensor 72 may be a mechanical sensor, such as a switch that the cover 70 contacts and separates from, or an optical sensor for emitting light that is transmitted or interrupted depending on the position of the cover 70, for example. The cover sensor 72 is configured to output, to the controller 130, a position signal corresponding to the position of the cover 70.

The cover sensor 72 is configured to output either a first position signal or a second position signal to the controller 130. The first position signal outputted from the cover sensor 72 indicates that the cover 70 is in the covering position. The second position signal outputted from the cover sensor 72 indicates that the cover 70 is in a position other than the covering position (the exposing position, for example). In the present embodiment, the first position signal outputted from the cover sensor 72 has a signal level of 0 V, and the second position signal outputted from the cover sensor 72 has a signal level of 3.3. V. In the following description, an expression "cover open event" will be used to indicate that the position signal outputted from the cover sensor 72 has changed from the first position signal to the second position signal, while an expression "cover close event" will be used to indicate that the position signal outputted from the cover sensor 72 has changed from the second position signal to the first position signal.

<Display Section 15>

As illustrated in FIGS. 1A, 1B and 5, the MFP 10 also includes a display section 15. The display section 15 displays information for the user in the form of messages. While there are no particular limitations on the specific structure of the display section 15, a liquid crystal display or an organic electro-luminescence display may be employed as the display section 15, for example. The display section 15 is an example of a display.

The display section 15 according to the present embodiment has a rectangular shape with 8 dots vertically by 80 dots horizontally. Thus, the display section 15 can display a maximum of 16 characters (including spaces), each comprising 8 dots vertically by 5 dots horizontally (approximately 8 mm vertically by approximately 5 mm horizontally). Further, when attempting to display a character string exceeding 16 characters on the display section 15, the character string is displayed in a scrolling format. When attempting to display character strings in a plurality of lines on the display section 15, the character string for each line is displayed in sequence. However, the size of the display section 15 is not limited to the above example.

<Operation Section 17>

The MFP 10 also includes an operation section 17 for receiving user operations. The operation section 17 is an input interface that accepts input from a user indicating instructions for the MFP 10. The operation section 17 according to the present embodiment is configured of a plurality of push buttons, including numeric keypad 17A and a power button 17B. However, the push buttons provided in the operation section 17 are not limited to the above example, and may include directional keys corresponding to "up", "down", "right", and "left". Further, the specific configuration of the operation section 17 is not limited to the push buttons, but may be a touchscreen superimposed over the display screen of the display section 15. The operation section 17 is an example of an operation interface.

The operation section 17 is configured to output, to the controller 130, operation signals corresponding to the push buttons that is pressed. Specifically, the operation section 17 according to the present embodiment is configured to output a first operation signal, a second operation signal, and a third operation signal to the controller 130. The operation section 17 outputs the first operation signal to the controller 130 when the [1] button in the numeric keypad 17A is pressed. The operation section 17 outputs the second operation signal to the controller 130 when the [2] button in the numeric keypad 17A is pressed. The operation section 17 outputs the third operation signal to the controller 130 when the power button 17B is pressed. The operation section 17 also outputs, to the controller 130, other operation signals corresponding to other buttons when the other buttons are pressed.

In the following description, an expression "the [1] button is pressed" will indicate that the operation section 17 outputs the first operation signal, an expression "the [2] button is pressed" will indicate that the operation section 17 outputs the second operation signal, and an expression "the power button 17B is pressed" will indicate that the operation section 17 outputs the third operation signal. Note that the buttons corresponding to the first operation signal, the second operation signal, and the third operation signal are not limited to the above example.

<Communication Section 25>

As illustrated in FIG. 5, the MFP 10 also includes a communication section 25. The communication section 25 is an interface through which the MFP 10 communicates with external devices. In other words, the MFP 10 is configured to transmit various data to external devices through the communication section 25 and to receive various data from external devices through the communication section 25. The communication section 25 may also function as a facsimile receiving section that receives facsimile data from external devices.

<Power Supply Section 120>

The MFP 10 also includes a power supply section 120. The power supply section 120 is configured to receive electric power from an external power source when the MFP 10 is plugged into the external power source, and to supply this electric power to various components in the MFP 10. More specifically, through the electric power acquired from the external power source, the power supply section 120 outputs drive power (24 V, for example) to the conveying section 23, the recording section 24, and the like and outputs control power (5 V, for example) to the controller 130. The power supply section 120 includes an internal power supply 121. The power supply section 120 charges the internal power supply 121 with part of the electric power supplied from the external power source.

The power supply section 120 can switch between a plug ON state and a plug OFF state. In the plug ON state, the MFP 10 is plugged into the external power source, and the MFP 10 receives electric power from the external power source through the plug. In the plug OFF state, the MFP 10 is unplugged, and the power supply section 120 does not receive electric power from the external power source. Hence, the power supply section 120 charges the internal power supply 121 with some of the electric power supplied from the external power source during the plug ON state, but does not charge the internal power supply 121 during the plug OFF state.

The power supply section 120 in the plug ON state can switch between a switch ON state and a switch OFF state based on a power signal outputted from the controller 130. While the power supply section 120 is in the switch OFF state, the controller 130 switches the power supply section 120 to the switch ON state when the power button 17B is pressed. Similarly, while the power supply section 120 is in the switch ON state, the controller 130 switches the power supply section 120 to the switch OFF state when the power button 17B is pressed.

In the switch OFF state, the power supply section 120 still supplies electric power to the controller 130 and the operation section 17, but does not supply electric power to the conveying section 23, the recording section 24, the display section 15, and the communication section 25. In other words, the controller 130 and the operation section 17 can still operate during the switch OFF state, but the conveying section 23, the recording section 24, the display section 15, and the communication section 25 are inoperable during the switch OFF state. In the switch OFF state, electric power may or may not be supplied to the cover sensor 72 and the residual ink sensor 73. During the switch ON state, electric power is supplied to the greater number of components of the MFP 10 than during the switch OFF state.

During the switch ON state, the power supply section 120 can switch between a drive state and an idle state based on a power signal outputted from the controller 130. The controller 130 switches the power supply section 120 from the idle state to the drive state when an operation is performed on the operation section 17 or when the controller 130 receives information through the communication section 25. The controller 130 switches the power supply section 120 from the drive state to the idle state when the operation section 17 has not been operated and the controller 130 has not received information through the communication section 25 for a prescribed time interval.

In the drive state, the power supply section 120 supplies electric power to all of the components in the MFP 10. In other words, all of the components in the MFP 10 are operable in the drive state. In the idle state, the power supply section 120 supplies electric power to the controller 130, the operation section 17, the communication section 25, the cover sensor 72, and the residual ink sensor 73, but does not supply electric power to the display section 15, the conveying section 23, and the recording section 24. Hence, the controller 130, the operation section 17, the communication section 25, the cover sensor 72, and the residual ink sensor 73 are operable in the idle state, but the conveying section 23, the recording section 24, and the display section 15 are inoperable in the idle state.

<Controller 130>

As illustrated in FIG. 5, the controller 130 includes a central processing unit (CPU) 131, a read-only memory (ROM) 132, a random-access memory (RAM) 133, an electrically erasable programmable ROM (EEPROM) 134, and an application-specific integrated circuit (ASIC) 135. The CPU 131, the ROM 132, the RAM 133, the EEPROM 134, and the ASIC 135 are interconnected with one another via an internal bus 137. The ROM 132 stores programs and the like with which the CPU 131 controls various operations. The RAM 133 is used as a storage area for temporarily storing data, signals, and the like used when the CPU 131 executes the above programs, or as a work area for data processes. The EEPROM 134 stores settings, flags, and the like that must be preserved even during the plug OFF state. The ROM 132, the RAM 133, and the EEPROM 134 are examples of a memory.

The EEPROM 134 stores a count value for each of the ink chambers 111B, 111Y, 111C, and 111M. The count value in the present embodiment is set to an initial value (0 or 80, for example) in steps S26, S36, and S41 (described later) and is incremented in S56 (described later) based on the quantity of ink ejected from the recording section 24. In the following description, the count value for the ink chamber 111B will be referred to as the "count value B," the count value for the ink chamber 111Y will be referred to as the "count value Y," the count value for the ink chamber 111C will be referred to as the "count value C," and the count value for the ink chamber 111M will be referred to as the "count value M."

The EEPROM 134 also stores a first threshold value and a second threshold value for each of the ink chambers 111B, 111Y, 111C, and 111M. The first threshold value is set to a slightly smaller value (95, for example) than the maximum storage quantity (100, for example) of ink that can be stored in the corresponding ink chamber 111, for example. A difference between the maximum storage quantity and the first threshold value for the ink chamber 111B is equivalent to the residual ink threshold, for example. The second threshold value is set to a value (85, for example) closer to the initial value of the count value than the first threshold value is to the initial value. A difference between the maximum storage quantity and the second threshold value is equivalent to the quantity of ink stored in the corresponding ink chamber 111 when the level of ink in the ink chamber 111 is aligned with the second line 147, for example.

In the following description, a state of the ink chamber 111 when the difference between the first threshold value and the corresponding count value (first threshold value−count value) is less than 0 will be referred to as a "soft-empty" state. Further, a state of the ink chamber 111 when the difference between the second threshold value and the corresponding count value (second threshold value−count value) is less than 0 will be referred to as an "ink low" state. Hence, the ink chamber 111 arrives at the ink low state prior to the soft-empty state. Ideally or theoretically, a timing at which the ink chamber 111 reaches the soft-empty state is equivalent to a timing at which the ink chamber 111 reaches the hard-empty state. The difference between the first threshold value and the count value and the difference between the second threshold value and the count value may be used as estimation values of the quantity of ink remaining in the corresponding ink chamber 111. The count value, the first threshold value, and the second threshold value are an example of ink quantity information. "Soft-empty" is an example of the quantity of ink stored in the ink chamber 111 being less than the residual ink threshold.

Note that the count value, the first threshold value, and the second threshold value are not limited to the relationships described above. As an alternative example, the count value may be set to an initial value (100 or 20, for example) in steps S26, S36, and S41, and may be decremented in S56 based on the quantity of ink ejected from the recording section 24. Here, the first threshold value may be set to a smaller value (5, for example) than the second threshold value (15, for example). In this variation, the soft-empty state is determined based on (count value−first threshold value), and the ink low state is determined based on (count value−second threshold value).

In other words, the count value should be updated in S56 in a direction approaching the first threshold value. Here, the expression "a direction approaching the first threshold value" represents the relationship between the count value and the first threshold value when the count value has been set to its initial value. That is, an incremented count value is continuously incremented, even after reaching the first threshold value. Similarly, a decremented count value is continuously decremented, even after reaching the first threshold value. Further, the second threshold value should be set to a value at which its difference with the count value reaches 0 before the difference between the count value and the first threshold value reaches 0.

Note that the difference between the first threshold value and the corresponding count value is obtained by subtracting one of the first threshold value and the count value from the other of the first threshold value and the count value. Further, the difference between the second threshold value and the corresponding count value is obtained by subtracting one of the second threshold value and the count value from the other of the second threshold value and the count value. In a case where the difference between the first threshold value and the correspond count value is obtained by subtracting the first threshold value from the count value, the difference between the second threshold value and the corresponding count value should be obtained by subtracting the second threshold value from the count value. In a case where the difference between the first threshold value and the corresponding count value is obtained by subtracting the count value from the first threshold value, the difference between the second threshold value and the corresponding count value should be obtained by subtracting the count value from the second threshold value. The difference between the first threshold value and the corresponding count value is an example of a first difference. The difference between the second threshold value and the corresponding count value is an example of a second difference.

The EEPROM 134 also stores a soft-empty flag and an ink low flag for each of the ink chambers 111B, 111Y, 111C, and 111M. The soft-empty flag is information indicating whether the corresponding ink chamber 111 is in the soft-empty state. The soft-empty flag is set to either a value "ON" corresponding to the soft-empty state or a value "OFF" corresponding to a non-soft-empty state. The ink low flag is information indicating whether the corresponding ink chamber 111 is in the ink low state. The ink low flag is set to either a value "ON" corresponding to the ink low state or a value "OFF" corresponding to a non-ink-low state.

The soft-empty flag according to the present embodiment is set to "ON" when the difference between the first threshold value and the corresponding count value is less than 0 in S56, for example, and is set to "OFF" in S26, S36, and S41. The ink low flag according to the present embodiment is set to "ON" when the difference between the second threshold value and the corresponding count value is less than 0 in S56, for example, and is set to "OFF" in S26, S36, and S41. The initial value of the soft-empty flag and the initial value of the ink low flag are both "OFF".

The EEPROM 134 also stores a hard-empty flag. The hard-empty flag is information indicating whether the ink chamber 111B has entered the hard-empty state the last time ink was ejected from the recording section 24. The hard-empty flag is set to either a value "ON" corresponding to the hard-empty state or a value "OFF" corresponding to a non-hard-empty state. The hard-empty flag according to the present embodiment is set to "ON" during image recording in S55 described later when the residual ink signal outputted from the residual ink sensor 73 switches from the first residual ink signal to the second residual ink signal, for example, and is set to "OFF" in S26, S36, and S41. The initial value of the hard-empty flag is "OFF".

In the following description, the soft-empty flag and the ink low flag corresponding to the ink chamber 111B will be referred to as the "soft-empty flag B" and the "ink low flag B," respectively; the soft-empty flag and the ink low flag corresponding to the ink chamber 111Y will be referred to as the "soft-empty flag Y" and the "ink low flag Y," respectively; the soft-empty flag and the ink low flag corresponding to the ink chamber 111C will be referred to as the "soft-empty flag C" and the "ink low flag C," respectively; the soft-empty flag and the ink low flag corresponding to the ink chamber 111M will be referred to as the "soft-empty flag M" and the "ink low flag M," respectively. The hard-empty flag indicates the state of the ink chamber 111B, since the residual ink sensor 73 and the ink detection portion 152 are only provided for the tank 100B in the present embodiment. Hence, the soft-empty flag B may be omitted in this case.

Further, the conveying section 23, the recording section 24, the display section 15, the communication section 25, the operation section 17, the cover sensor 72, and the residual ink sensor 73 are connected to the ASIC 135. The controller 130 controls the conveying section 23 to convey sheets, controls the recording section 24 to eject ink, controls the display section 15 to display screens, and controls the communication section 25 to communicate with external devices. Further, the controller 130 acquires operation signals from the operation section 17, acquires position signals from the cover sensor 72, and acquires residual ink signals from the residual ink sensor 73. As an example, the controller 130 may read the position signal outputted from the cover sensor 72 and the residual ink signal outputted from the residual ink sensor 73 at prescribed time intervals (every 50 msec, for example).

The controller 130 also includes an internal clock (otherwise known as a hardware clock) that outputs time information. The internal clock is updated by electric power supplied from the external power source through the power supply section 120 when the power supply section 120 is in the plug ON state (i.e., in any of the switch OFF state, the switch ON state, the idle state, and the drive state). When the power supply section 120 is in the plug OFF state, on the other hand, the internal clock is updated by electric power supplied from the internal power supply 121. When the charge in the internal power supply 121 is depleted, the time information outputted from the internal clock is reset to an initial value (a null value, for example).

<Operations of MFP 10>

Next, operations of the MFP 10 according to the present embodiment will be described with reference to FIGS. 6 through 9. The CPU 131 of the controller 130 performs all processes described in FIGS. 6 through 9. Note that, to implement the following processes, the CPU 131 may read and execute a program stored in the ROM 132. Alternatively, the following processes may be implemented by hardware circuits mounted in the controller 130.

<Cover Open Process>

Figure 6:
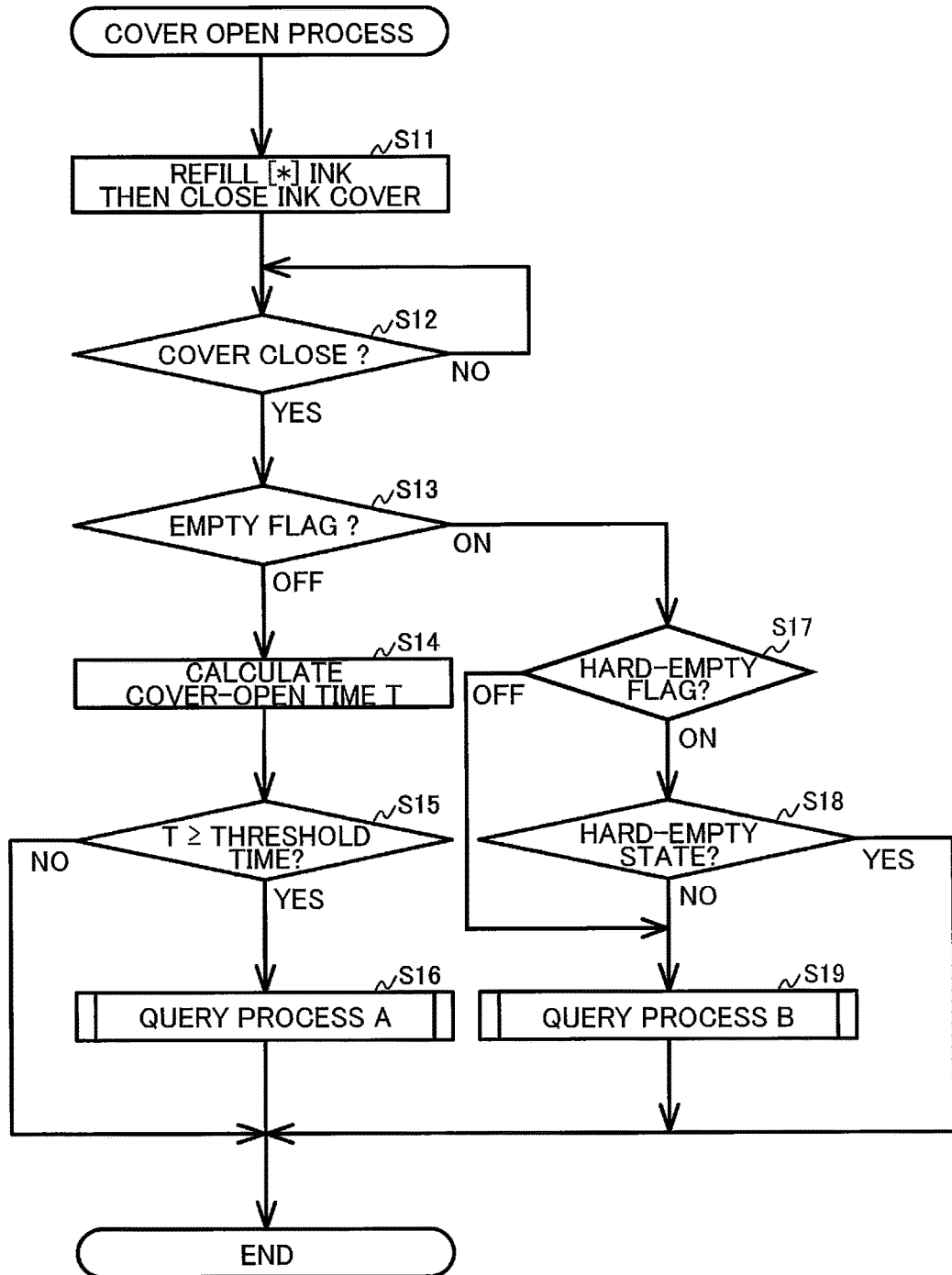
FIG. 6 is a flowchart illustrating steps in a cover open process performed by a controller 130 of the MFP 10 according to the embodiment.

First, the controller 130 detects the cover open event through the cover sensor 72 and performs a cover open process illustrated in FIG. 6 in response to the detection of the cover open event through the cover sensor 72. The controller 130 performs the cover open process in response to the movement of the cover 70 from its covering position to its exposing position while the MFP 10 is in a standby state (a state in which the MFP 10 is not performing an image recording process described later), for example. The cover open process is performed to prompt the user to refill an ink chamber 111 with ink and to confirm with the user that the ink chamber 111 has been refilled.

In S11 at the beginning of the cover open process in FIG. 6, the controller 130 controls the display section 15 to display a refill notification screen on the display section 15. A character string "REFILL [*] INK" and a character string "THEN CLOSE INK COVER" are alternately displayed in the refill notification screen, for example. Here, "[*]" is replaced with characters representing the colors of ink that need to be refilled (Bk, Y, C, and M). The controller 130 may include, in the refill notification screen, characters representing the colors of ink stored in ink chambers 111 in the ink low state. The controller 130 controls the display section 15 to continuously display the refill notification screen on the display section 15 until the controller 130 detects the cover close event through the cover sensor 72 (S12: NO). In addition, the controller 130 acquires, from the internal clock, first time information indicative of time that the cover open event is detected and stores this first time information in the RAM 133.

When viewing the refill notification screen, the user removes the cap 113 from the inlet 112 of the ink chamber 111 to be refilled and injects ink into the ink chamber 111. After refilling the ink chamber 111, the user closes the inlet 112 with the cap 113 and moves the cover 70 back to the covering position. At this time, the user may refill ink of only those colors indicated in the refill notification screen, may refill ink of all colors, or may not refill ink of any color. However, the controller 130 cannot detect what colors of ink have been replenished.

In response to the detection of the cover close event through the cover sensor 72 (S12: YES), the controller 130 infers that ink has been injected into at least one of the ink chambers 111 through the corresponding inlet 112. The process in S12 is an example of an inference process to infer whether the ink chambers 111 have been refilled. However, the method of inferring whether ink has been injected is not limited to the above example. As a variation, the controller 130 may infer that ink has been injected in response to receiving a user operation through the operation section 17 instructing the controller 130 to display a screen for resetting the count value.

Next, in response to the inference that at least one of the ink chambers 111 has been refilled (S12: YES), in S13 the controller 130 determines the settings for the hard-empty flag and the soft-empty flags Y, C, and M. Specifically, the controller 130 determines whether at least one of the hard-empty flag and the soft-empty flags Y, C, and M has been set to "ON" (S13: ON) or whether all of the hard-empty flag and the soft-empty flags Y, C, and M have been set to "OFF" (S13: OFF). Note that the settings for the hard-empty flag and the soft-empty flags Y, C, and M are never updated while the cover 70 is in the exposing position. The process in S13 is an example of a first determination process for determining whether any ink chamber 111 is in an empty state at the time of inference.

In response to the determination that all of the hard-empty flag and the soft-empty flags Y, C, and M have been set to "OFF" (S13: OFF), in S14 the controller 130 calculates a cover-open time T. The cover open time T is an example of an exposing time. The cover-open time T is a time interval during which the cover 70 has been in the exposing position. In other words, the cover-open time T is a time during which the cover sensor 72 has continuously outputted the second position signal. To calculate the cover-open time T, the controller 130 acquires, from the internal clock, second time information indicative of time that the cover close event is detected and subtracts the time indicated by the second time information from the time indicated by the first time information, for example.

In S15 the controller 130 determines whether the cover-open time T calculated in S14 is greater than or equal to a threshold time. The threshold time is a preset time thought to be necessary for a typical user to inject ink into an ink chamber 111. The process in S15 is an example of a second determination process. In response to the determination that the cover-open time T is greater than or equal to the threshold time (S15: YES), in S16 the controller 130 performs a query process A described later. On the other hand, in response to the determination that the cover-open time T is less than the threshold time (S15: NO), the controller 130 ends the cover open process without performing the query process A of S16.

However, in response to the determination that at least one of the hard-empty flag and the soft-empty flags Y, C, and M has been set to "ON" (S13: ON), in S17 the controller 130 determines the setting for the hard-empty flag. In response to the determination that the hard-empty flag has been set to "ON" (S17: ON), in S18 the controller 130 determines whether the residual ink signal outputted from the residual ink sensor 73 at the current point in time indicates the hard-empty state. In response to the determination that the residual ink signal does not indicate the hard-empty state at the current point in time (S18: NO), in S19 the controller 130 performs a query process B. However, in response to the determination that the residual ink signal indicates the hard-empty state at the current point in time (S18: YES), the controller 130 ends the cover open process without performing the query process B of S19. In addition, in response to the determination that the hard-empty flag has been set to "OFF" but that at least one of the soft-empty flags Y, C, and M has been set to "ON" (S17: OFF), the controller 130 skips the determination in S18 and performs the query process B in S19.

<Query Process A>

The query process A is performed in a case where the controller 130 determines in S13 that all of the hard-empty flag and the soft-empty flags Y, C, and M have been set to "OFF". The query process A serves to inquire of the user whether the ink chambers 111 have been refilled with ink and to initialize the corresponding count values for the ink chambers 111 based on the user's response. Next, the query process A will be described in detail with reference to FIG. 7.

Figure 7:
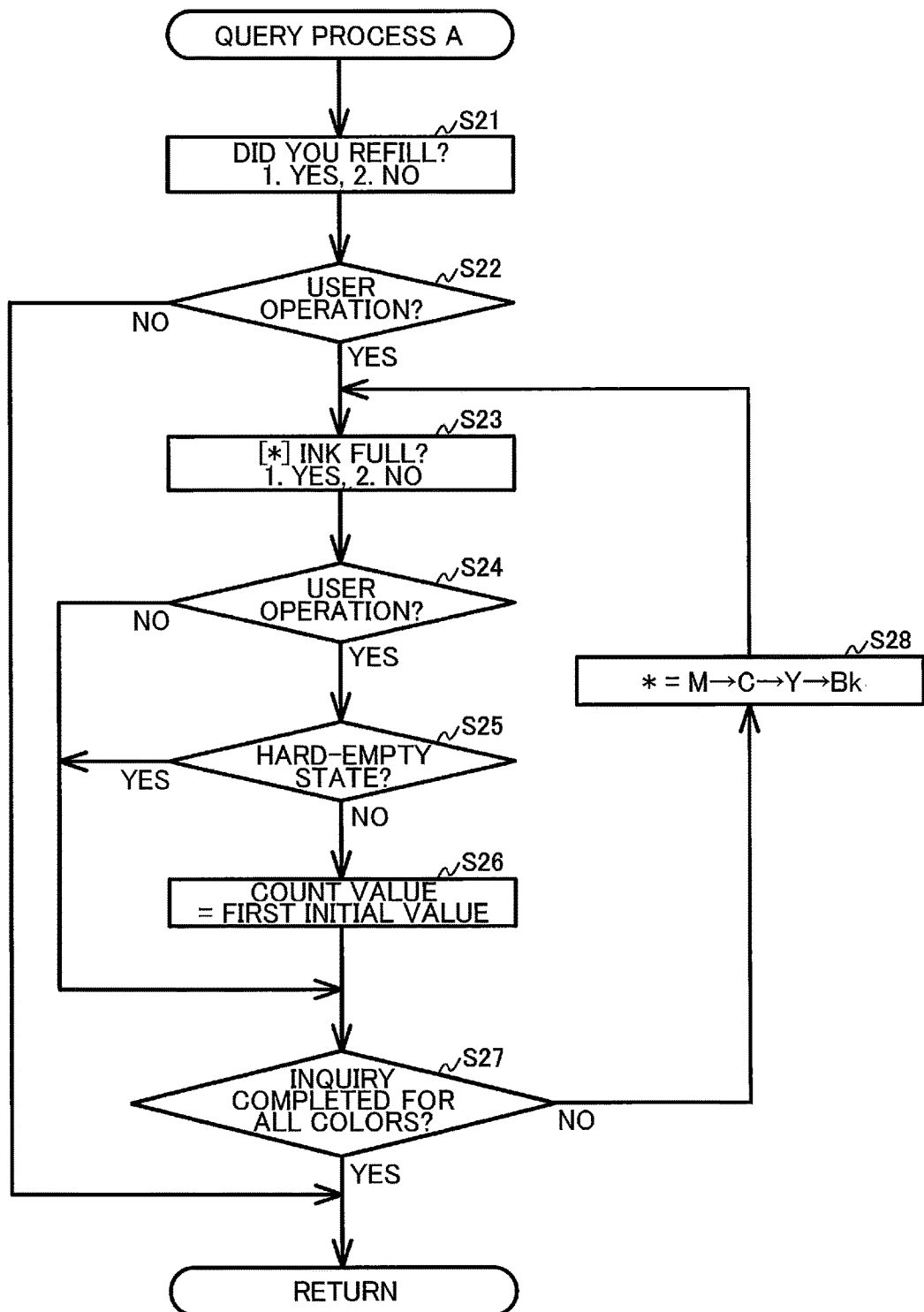
FIG. 7 is a flowchart illustrating steps in a query process A performed by the controller 130 according to the embodiment.
Figure 8:
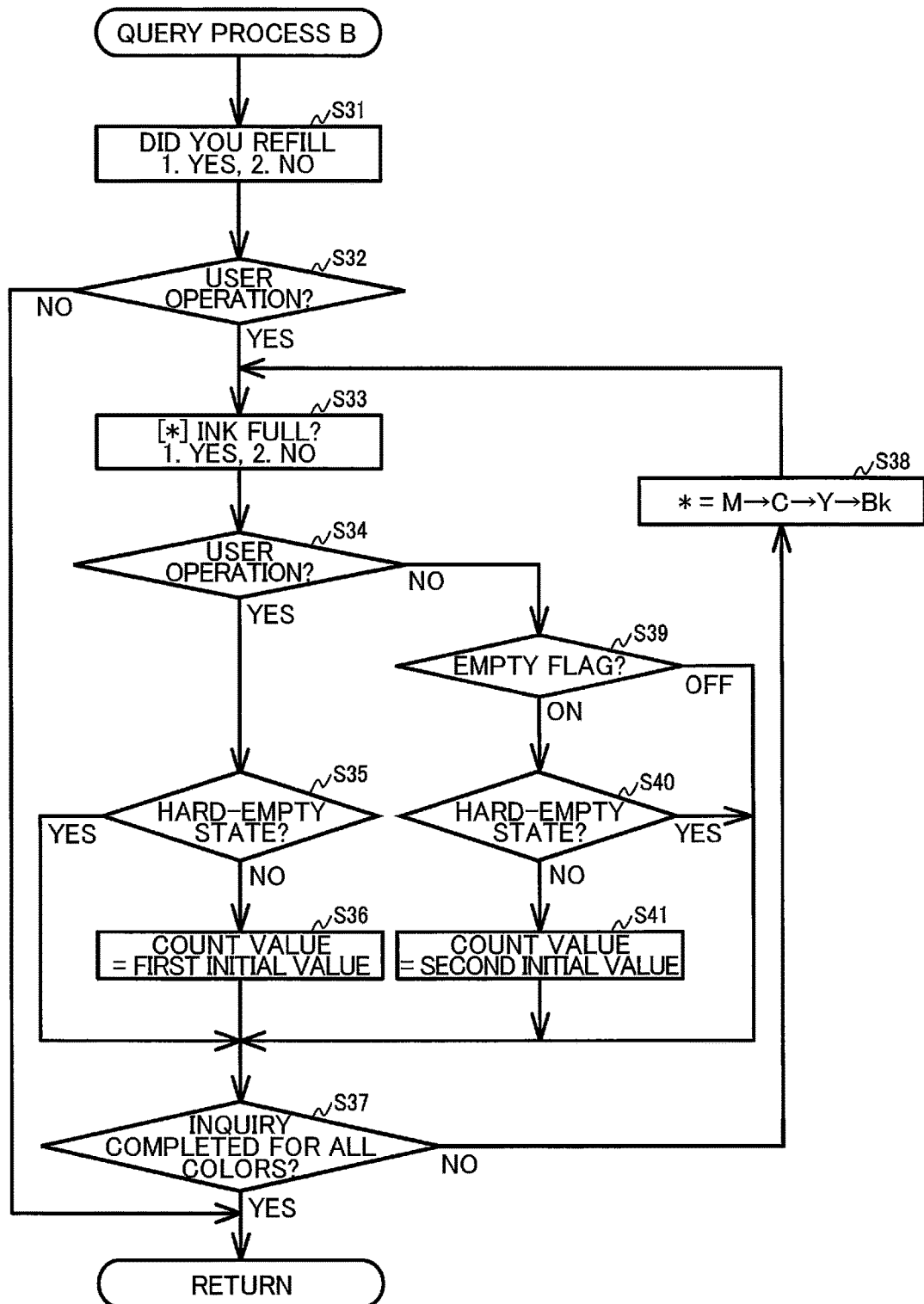
FIG. 8 is a flowchart illustrating steps in a query process B performed by the controller 130 according to the embodiment.

In S21 at the beginning of FIG. 7, the controller 130 controls the display section 15 to display a preliminary inquiry screen on the display section 15. The preliminary inquiry screen prompts the user to indicate whether at least one of the ink chambers 111 has been refilled. For example, a character string "DID YOU REFILL?" and a character string "1. YES, 2. NO" are alternately displayed in the preliminary inquiry screen. The controller 130 controls the display section 15 to continuously display the preliminary inquiry screen on the display section 15 until the controller 130 receives a third operation or a fourth operation through the operation section 17 (S22).

The third operation is a user operation for indicating that at least one of the ink chambers 111 has been refilled with ink and corresponds to pressing the [1] button, for example. The fourth operation is a user operation for indicating that none of the ink chambers 111 has been refilled with ink and corresponds to pressing the [2] button, for example. The process in S21 and S22 is an example of a preliminary inquiry process.

In response to the pressing of the [1] button while the preliminary inquiry screen is displayed (S22: YES), in S23 the controller 130 controls the display section 15 to display an inquiry screen on the display section 15 that targets the ink chamber 111M. This inquiry screen prompts the user to indicate whether the ink chamber 111M has been refilled with ink up to its maximum storage quantity. For example, a character string "M INK FULL?" and a character string "1. YES, 2. NO" are alternately displayed in the inquiry screen. The controller 130 controls the display section 15 to continuously display the inquiry screen on the display section 15 until the controller 130 receives a first operation or a second operation through the operation section 17 (S24).

The first operation is a user operation for indicating that the ink chamber 111M has been refilled with ink up to the level of its maximum storage quantity and corresponds to pressing the [1] button, for example. The second operation is a user operation either for indicating that the ink chamber 111M has been refilled with ink but not up to the level of its maximum storage quantity in a case where, of the ink chambers 111, the ink chamber 111M has been refilled and the [1] button is pressed in S22, or for indicating that the ink chamber 111M has not been refilled in a case where the [1] button is pressed in S22 but any of the ink chambers 111 other than the ink chamber 111M has been refilled. The second operation corresponds to pressing the [2] button, for example.

Note that the first operation and the third operation may correspond to pressing the same button or may correspond to pressing different buttons. This is also true for the second operation and the fourth operation. The process in S23 and S24 is an example of an inquiry process.

In response to the pressing of the [1] button while the inquiry screen targeting the ink chamber 111M is displayed (S24: YES), the controller 130 skips the process in S25 and advances to S26. In S26 the controller 130 sets the count value M to a first initial value (0) and sets the soft-empty flag M and the ink low flag M to "OFF". The process in S26 is an example of a first initialization process. On the other hand, in response to the pressing of the [2] button while the inquiry screen targeting the ink chamber 111M is displayed (S24: NO), then the controller 130 advances to S27 without performing the process in S25 and S26.

In S27 the controller 130 determines whether the process in S23-S26 has been completed for all colors. While the process in S23-S26 has not been performed for all colors (S27: NO), in S28 the controller 130 sets the target color to the next color in the sequence M→C→Y→Bk. In this way, the process in S23-S26 is repeated for each of the ink chambers 111M, 111C, 111Y, and 111B. While repeating the process in S23-S26, the controller 130 initializes the count value for the corresponding ink chamber 111 to the first initial value in response to the pressing of the [1] button, but does not initialize the count value for the corresponding ink chamber 111 in response to the pressing of the [2] button. Put another way, the controller 130 will not perform a second initialization process (S41) described later in response to the pressing of the [2] button while the inquiry screen is displayed in the query process A.

Further, when performing the process in S23-S26 targeting the ink chamber 111B, the controller 130 advances to S25 in response to the pressing of the [1] button while the inquiry screen is displayed (S24: YES). In S25 the controller 130 determines whether the ink chamber 111B is in the hard-empty state at the current point in time. In response to the determination that the ink chamber 111B is not in the hard-empty state at the current point in time (S25: NO), in S26 the controller 130 initializes the count value B to the first initial value and sets the hard-empty flag, the soft-empty flag B, and the ink low flag B to "OFF". On the other hand, in response to the determination that the ink chamber 111B is in the hard-empty state at the current point in time (S25: YES), the controller 130 skips S26 and advances to S27.

After the controller 130 has completed the process in S23-S26 for all the ink chambers 111 (S27: YES), the controller 130 ends the query process A. Note that the sequence in which the controller 130 performs the process in S23-S26 for the ink chambers 111M, 111C, 111Y, and 111B is not limited to the above example.

Further, in response to the pressing of the [2] button while the preliminary inquiry screen is displayed (S22: NO), the controller 130 ends the query process A without performing the process in S23-S28 even one time.

<Query Process B>

The query process B is performed in a case where the controller 130 determines in S13 that at least one of the hard-empty flag and the soft-empty flags Y, C, and M has been set to "ON". The query process B serves to inquire of the user whether any of the ink chambers 111 have been refilled and to initialize the corresponding count values for the ink chambers 111 based on the user's response. Next, the query process B will be described in detail with reference to FIG. 8.

The following description of the query process B omits the details of points in common with the query process A and focuses on points of difference from the query process A. The process in S31-S38 in the query process B is equivalent to the process in S21-S28 in the query process A. However, the query process B differs from the query process A in that the controller 130 performs the process in S39-S41 in response to the determination in S34 that the [2] button has been pressed while the inquiry screen is displayed (S34: NO).

For example, in response to the pressing of the [2] button while the inquiry screen targeting the ink chamber 111M is displayed (S34: NO), in S39 the controller 130 determines the setting for the soft-empty flag M. Specifically, the controller 130 determines whether the soft-empty flag M has been set to "ON" or "OFF". In response to the determination that the soft-empty flag M has been set to "ON" (S39: ON), the controller 130 skips the process in S40 and advances to S41. In S41 the controller 130 sets the count value M to a second initial value (80) and sets the soft-empty flag M and the ink low flag M to "OFF". On the other hand, in response to the determination that the soft-empty flag M has been set to "OFF" (S39: OFF), the controller 130 advances to S37 without performing the process in S40 and S41.

The process performed in S39-S41 is identical when targeting the ink chambers 111C and 111Y. However, in response to the determination that the hard-empty flag has been set to "ON" (S39: ON), the controller 130 advances to S40. In S40 the controller 130 determines whether the ink chamber 111B is in the hard-empty state at the current point in time. In response to the determination that the ink chamber 111B is not in the hard-empty state at the current point in time (S40: NO), then in S41 the controller 130 sets the count value B to the second initial value and sets the hard-empty flag, the soft-empty flag B, and the ink low flag B to "OFF". On the other hand, in response to the determination that the ink chamber 111B is in the hard-empty state at the current point in time (S40: YES), the controller 130 skips S41 and advances to S37.

Hence, while repeating the process in S33-S36 and the process S39-S41, the controller 130 initializes the count value for the target ink chamber 111 to the first initial value when the [1] button has been pressed, and initializes the count value to the second initial value when the [2] button has been pressed. The process in S39 is an example of a third determination process, and the process in S41 is an example of a second initialization process.

The first initial value is a value that produces the maximum difference between the count value and the corresponding first threshold value. The second initial value, on the other hand, is a value that produces a smaller difference between the count value and the corresponding first threshold value than does the first initial value. Hence, the second initial value is greater than the first initial value in a case where the count value is to be incremented. Further, the second initial value produces a difference between the count value and the corresponding second threshold value that is greater than 0. Hence, the second initial value is smaller than the second threshold value in a case where the count value is to be incremented.

<Image Recording Process>

Next, an image recording process will be described with reference to FIG. 9. The controller 130 performs the image recording process based on a recording instruction that is inputted into the MFP 10. The recording instruction is an instruction to the MFP 10 to perform a recording process for recording images on sheets based on image data. While there is no particular limitation on the source for acquiring the recording instruction, the recording instruction may be acquired from the user through the operation section 17 or may be acquired from an external device through the communication section 25, for example. In addition, the recording instruction may instruct the MFP 10 to record images on sheets based on fax data.

Figure 9:
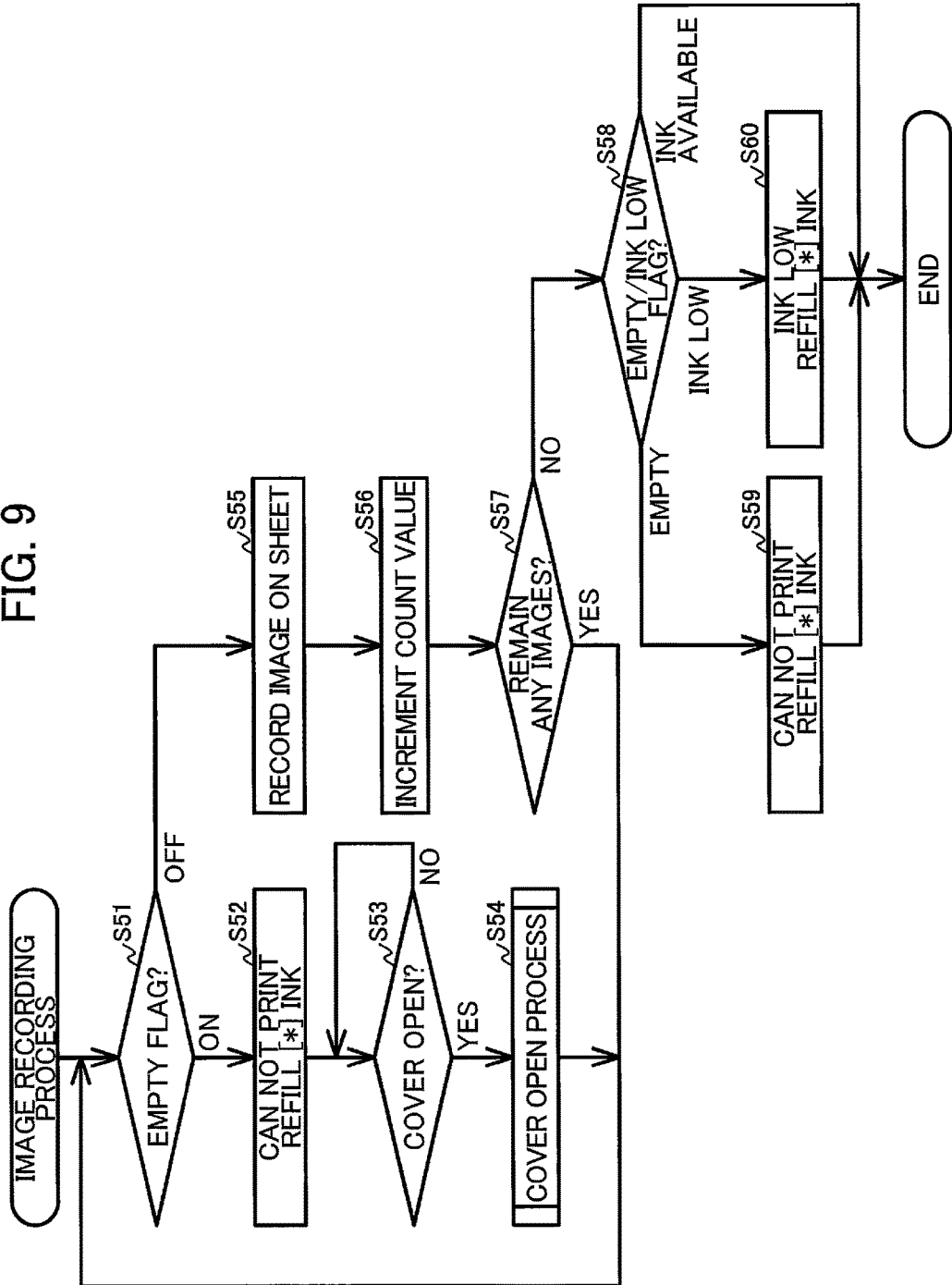
FIG. 9 is a flowchart illustrating steps in an image recording process performed by the controller 130 according to the embodiment.

In S51 at the beginning of the image recording process in FIG. 9, the controller 130 determines the settings for the hard-empty flag and the soft-empty flags Y, C, and M. The process in S51 is an example of a fifth determination process. Specifically, the controller 130 determines whether at least one of the hard-empty flag and the soft-empty flags Y, C, and M has been set to "ON" (S51: ON) or whether all of the hard-empty flag and the soft-empty flags Y, C, and M have been set to "OFF" (S51: OFF). In response to the determination that any one of the hard-empty flag and the soft-empty flags Y, C, and M has been set to "ON" (S51: ON), in S52 the controller 130 controls the display section 15 to display an empty notification screen on the display section 15. The empty notification screen is an example of a notification screen for notifying the user that the recording process cannot be performed until ink has been refilled. The process in S52 is an example of a notification process.

More specifically, a character string "CANNOT PRINT" and a character string "REFILL [*] INK" are alternately displayed in the empty notification screen. Here, "[*]" is replaced with characters representing the colors of ink stored in ink chambers 111 whose corresponding hard-empty flag and soft-empty flags Y, C, and M have been set to "ON". The controller 130 controls the display section 15 to continuously display the empty notification screen on the display section 15 until the controller 130 detects the cover open event through the cover sensor 72 (S53: NO). In response to the detection of the cover open event through the cover sensor 72 (S53: YES), in S54 the controller 130 performs the cover open process. After completing the cover open process, the controller 130 repeats the process from S51.

When any one of the hard-empty flag and the soft-empty flags Y, C, and M has been still set to "ON" after performing the cover open process (S51: ON), the controller 130 repeats the process from S52 described above.

On the other hand, in response to the determination that all of the hard-empty flag and the soft-empty flags Y, C, and M have been set to "OFF" (S51: OFF), in S55 the controller 130 records images on sheets based on image data included in the recording instruction. The process in S55 is an example of a recording process. Thus, the recording section 24 can eject ink when all of the hard-empty flag and the soft-empty flags Y, C, and M have been set to "OFF", but cannot eject ink when even one of the hard-empty flag and the soft-empty flags Y, C, and M has been set to "ON".

More specifically, in S55 the controller 130 controls the conveying section 23 to convey a sheet supported in the feed tray 20 to a position confronting the recording section 24. Next, the controller 130 controls the recording section 24 to eject ink toward the sheet confronting the recording section 24 to record an image on the sheet. Subsequently, the controller 130 controls the conveying section 23 to discharge the sheet having an image recorded by the recording section 24 into the discharge tray 21.

In addition, in S56 the controller 130 counts the quantity of ink ejected from the recording section 24 in S55 for each color and increments the corresponding count value. The process in S56 is an example of an updating process. Note that the timing for incrementing the count values is not limited to the timing of S56. Any time ink is ejected from the recording section 24, the controller 130 increments the corresponding count values based on the quantities of ink ejected from the recording unit 24, such as in a flushing process in which the recording section 24 ejects ink toward an ink receptor (not illustrated) or a purging process in which a pump or the like (not illustrated) forcibly discharges ink from the recording section 24.

Here, the controller 130 sets the hard-empty flag to "ON" when the residual ink signal outputted from the residual ink sensor 73 switches from the first residual ink signal to the second residual ink signal while the recording section 24 ejects ink. Further, when the difference between any count value and the corresponding second threshold value becomes less than 0 while the count values are incremented, the controller 130 sets the corresponding ink low flag to "ON". Further, when the difference between any count value and the corresponding first threshold value becomes less than 0 while the count values are incremented, the controller 130 sets the corresponding soft-empty flag to "ON".

In S57 the controller 130 determines whether there remain any images indicated in the recording instruction that have not been recorded on sheets. Until the controller 130 records all images indicated in the recording instruction on sheets (S57: YES), the controller 130 returns to S51 and repeats the process in S51-S56 described above. After all images indicated in the recording instruction have been recorded on sheets (S57: NO), in S58 the controller 130 determines the settings for the hard-empty flag, the soft-empty flags Y, C, and M, and the ink low flags B, Y, C, and M. The process in S58 is an example of a fourth determination process.

In response to the determination that any one of the hard-empty flag and the soft-empty flags Y, C, and M has been set to "ON" (S58: Empty), in S59 the controller 130 controls the display section 15 to display the empty notification screen on the display section 15. However, in response to the determination that all of the hard-empty flag and the soft-empty flags Y, C, and M have been set to "OFF" but any one of the ink low flags B, Y, C, and M has been set to "ON" (S58: Ink Low), in S60 the controller 130 controls the display section 15 to display an ink low notification screen on the display section 15. The process in S59 and S60 is an example of a notification process. On the other hand, in response to the determination that all of the hard-empty flag, the soft-empty flags Y, C, and M, and the ink low flags B, Y, C, and M have been set to "OFF" (S58: Ink Available), the controller 130 ends the image recording process without performing any of the process in S59 or S60.

The empty notification screen displayed in S59 may be identical to that displayed in S52. The ink low notification screen is an example of a notification screen for notifying the user that the ink chamber 111 is approaching the soft-empty state. Specifically, a character string "INK LOW" and a character string "REFILL [*] INK" are alternately displayed in the ink low notification screen. Here, "[*]" is replaced with characters representing the colors of ink stored in ink chambers 111 in the ink low state.

The controller 130 controls the display section 15 to continuously display the empty notification screen or the ink low notification screen on the display section 15 until one of the following events occurs: the cover open event is detected through the cover sensor 72, the recording instruction is inputted, the operation section 17 is operated, or the state of the power supply section 120 changes to a state other than the drive state (i.e., the idle state, the switch OFF state, or the plug OFF state).

<Operational Advantages>

In the embodiment described above, the ink quantity information for each ink chamber 111 is initialized to the first initial value or the second initial value based on the determination whether the ink chamber 111 is refilled with ink to its maximum capacity. Hence, an estimated value of the quantity of ink indicated in the ink quantity information can be set so as to approach the actual quantity of ink stored in the ink chamber 111, thereby reducing the possibility of air introduction into the channel leading from the ink chamber 111 to the recording unit 24. Further, setting the second initial value smaller than the second threshold value can prevent the ink low notification screen from being continuously displayed, even after the ink chamber 111 has been refilled.

According to the embodiment described above, when any one of the hard-empty flag and the soft-empty flags Y, C, and M becomes set to "ON", the user can supply the relevant ink chamber 111 with even a small amount of ink, for example, if that is all the user has on hand. By supplying even a small amount of ink to the ink chamber 111, the recording section 24 will be able to eject ink. Accordingly, the MFP 10 can resume image recording even if the user does not have an amount of replenishing ink necessary for filling the ink chamber 111 to its maximum capacity. If all of the hard-empty flag and the soft-empty flags Y, C, and M have been set to "OFF", on the other hand, the MFP 10 can continue image recording without initializing the ink quantity information. In this case, it is preferable not to initialize the ink quantity information in order to avoid air introduction.

Further, when the hard-empty flag has been set to "ON" but the ink chamber 111B is not in the hard-empty state at the time the controller 130 performs S18 (S17: ON; S18: NO), it is conceivable that the controller 130 has not initialized the ink quantity information despite the user refilling the ink chamber 111B with ink. In this case, it is preferable to perform the inquiry process. On the other hand, when the hard-empty flag has been set to "ON" and the ink chamber 111B is in the hard-empty state at the time the controller 130 performs S18 (S17: ON; S18: YES), it is likely that the ink chamber 111B has not been refilled. In this case, performing the inquiry process would not only increase the user's burden of performing operations, but also could result in the ink quantity information being mistakenly initialized if the user performs an incorrect operation. Therefore, it is preferable in this case not to perform the inquiry process to avoid increasing the user's burden of performing operations and the potential for air introduction.

In order to inject ink into the ink chamber 111 through the inlet 112, the cover 70 must be placed in the exposing position continuously for a certain amount of time. Hence, when the cover-open time T is less than the threshold time, it can be inferred that the cover 70 has been opened and closed for a purpose other than injecting ink. Further, when all of the hard-empty flag and the soft-empty flags Y, C, and M have been set to "OFF", image recording can be continued without initializing the ink quantity information. Therefore, it is preferable in this case not to perform the inquiry process in order to avoid increasing the user's burden of performing operations and the potential for air introduction.

In the embodiment described above, the controller 130 performs the inquiry process for each of the ink chambers 111, thereby suitably initializing the ink quantity information for each ink chamber 111, even when the quantity of ink injected differs among the ink chambers 111. Further, in the present embodiment, the user can avoid having the inquiry process performed repeatedly for each ink chamber 111 by performing the fourth operation in the preliminary inquiry screen. This can avoid an increase in the user's burden of performing operations and the potential for air introduction when the cover 70 is opened and closed for a purpose other than injecting ink, for example.

According to the embodiment described above, once one of the hard-empty flag and the soft-empty flags Y, C, and M becomes set to "ON", the controller 130 cannot perform the recording process until the corresponding ink chamber 111 is refilled with ink and the relevant count value, hard-empty flag, and soft-empty flags Y, C, and M are initialized. However, by employing the above process, the user can resume image recording simply by replenishing the ink chamber 111 with even a small amount of ink that the user has on hand and does not need to possess a full amount of ink required to refill the ink chamber 111 to its maximum capacity. The MFP 10 is configured so that the user can visually recognize the level of ink in the ink chambers 111 from outside the ink tank 100. Accordingly, if the user notices that the level of ink is low, the user can move the cover 70 to the exposing position and inject ink into the relevant ink chamber 111 through the corresponding inlet 112.

In the embodiment described above, the query process B are described as a process for determining whether to initialize count values for the four ink chambers 111 by combining a common preliminary inquiry process for all four ink chambers 111 with an individual inquiry process for each ink chamber 111. However, the specific content of the query process B is not limited to the above example.

Figure 10:
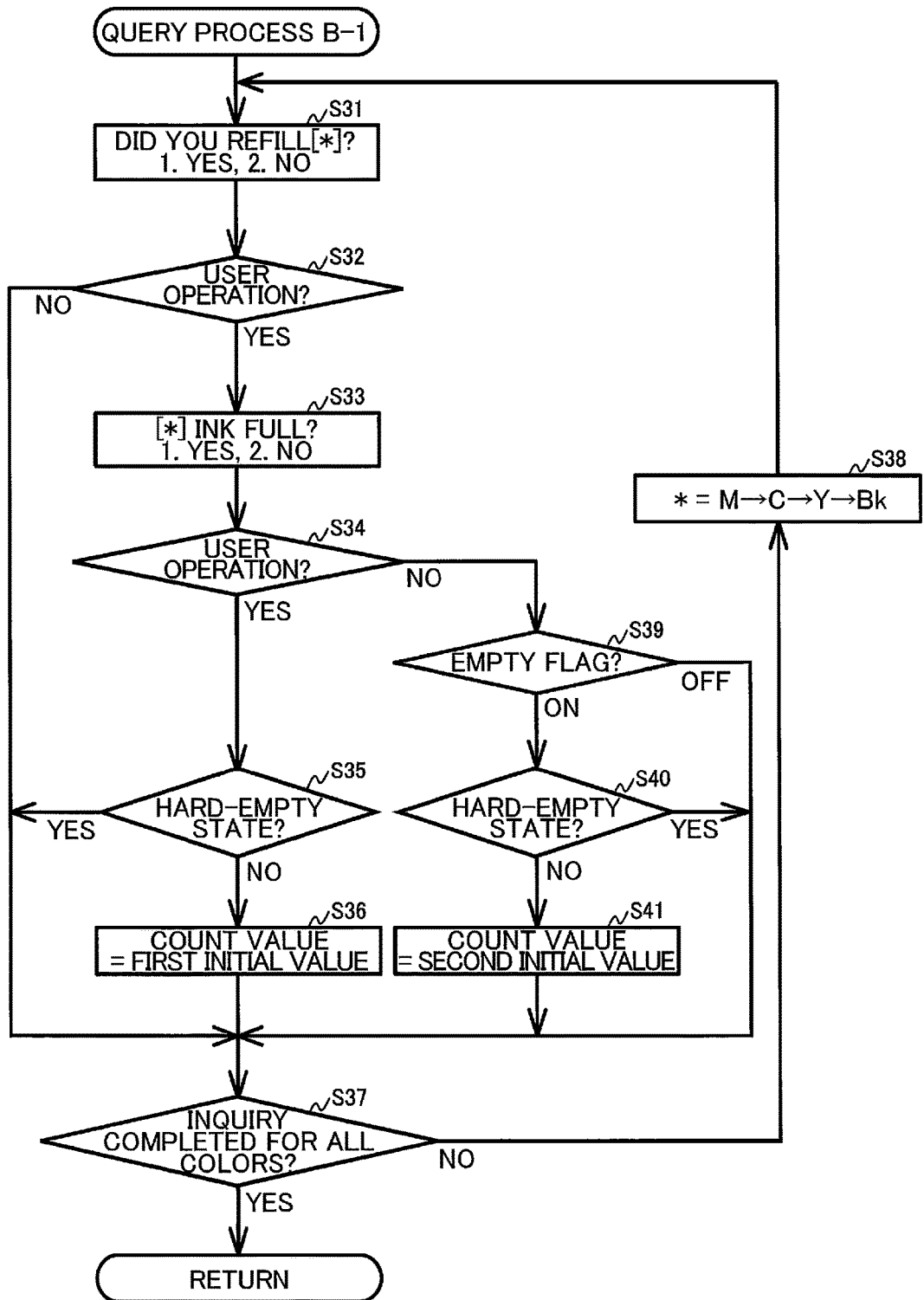
FIG. 10 is a flowchart illustrating steps in a query process B-1 performed by the controller 130 according to one variation.

As another example, the controller 130 may perform the preliminary inquiry process for each ink chamber 111 and may perform the inquiry process for each ink chamber 111. In this case, the controller 130 performs a query process B-1. While referring to FIG. 10, the query process B-1 will be described. The query process B-1 differs from the query process B in that the controller 130 advances to S37 in response to the determination in S32 that the [2] button has been pressed while the preliminary inquiry screen is displayed (S32: NO). The query process B-1 further differs from the query process B in that the controller 130 repeats the process in S31-S41 until the process in S31-41 has been completed for all of the ink chambers 111M, 111C, 111Y, and 111B.

The controller 130 performs the preliminary inquiry process for displaying the preliminary inquiry screen on the display section 15 asking the user whether the ink chamber 111M has been refilled and for receiving either the third operation or the fourth operation through the operation section 17 (S31).

In response to the pressing of the [1] button while the preliminary inquiry screen targeting the ink chamber 111M is displayed (S32: YES), the controller 130 performs the inquiry process for displaying the inquiry screen on the display section 15 asking the user whether the ink chamber 111M has been refilled to its maximum capacity and for receiving either the first operation or the second operation through the operation section 17 (S33). In this case, the second operation is a user operation for indicating that the ink chamber 111M has been refilled but not up to the level of its maximum storage quantity.

In response to the pressing of the [1] button while the inquiry screen targeting the ink chamber 111M is displayed (S34: YES), the controller 130 sets the count value M to the first initial value (S36). In response to the pressing of the [2] button while the inquiry screen targeting the ink chamber 111M is displayed (S34: NO), the controller 130 sets the count value M to the second initial value (S41).

On the other hand, in response to the pressing of the [2] button while the preliminary inquiry screen targeting the ink chamber 111M is displayed (S32: NO), the controller 130 does not perform the inquiry process targeting the ink chamber 111M and advances to S37. The controller 130 repeats the above process in sequence for the ink chambers 111C, 111Y, and 111B.

In the above variation, the controller 130 may ask the user questions such as "DID YOU REFILL [*]?" and "IS [*] INK FULL?" for each ink chamber 111. In this way, if only some of the ink chambers 111 have been refilled with ink, the controller 130 can properly initialize the count values for those ink chambers 111 that have been refilled while not initializing the count values for ink chambers 111 that have not been refilled, thereby appropriately initializing the count values.

Figure 11:
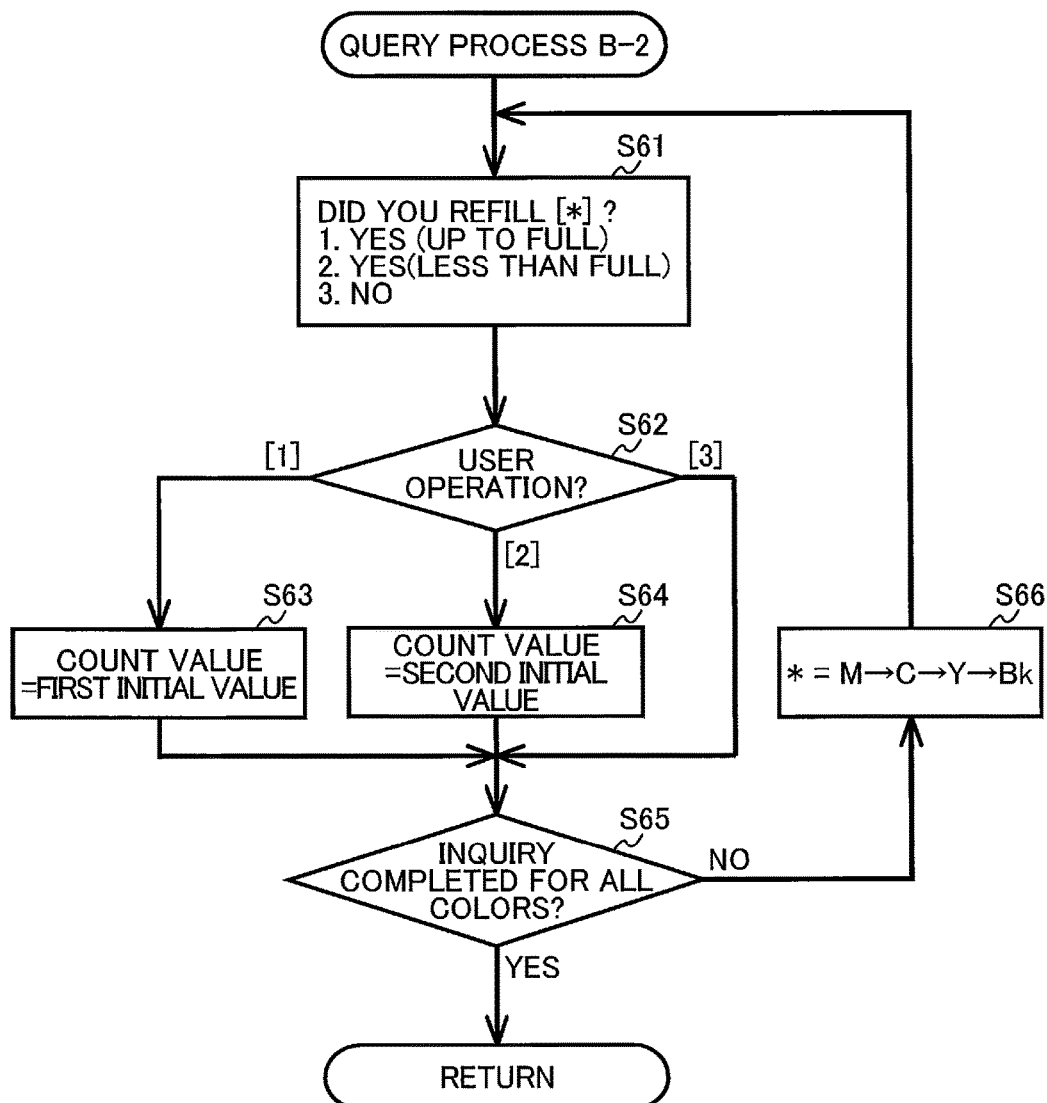
FIG. 11 is a flowchart illustrating steps in a query process B-2 performed by the controller 130 according to another variation.

As another variation, the preliminary inquiry process may be omitted, and the controller 130 may perform the inquiry process for each ink chamber 111 in order to receive one of a first operation, a second operation, and a third operation through the operation section 17. A query process B-2 according to this variation will be described while referring to FIG. 11.

In S61 the controller 130 controls the display section 15 to display an inquiry screen on the display section 15 that targets the ink chamber 111M. This inquiry screen prompts the user to indicate whether the ink chamber 111M has been refilled with ink up to its maximum storage quantity. The controller 130 continuously displays the inquiry screen on the display section 15 until the controller 130 receives one of the first operation, the second operation, and the third operation through the operation section 17 (S62). The process in S61 and S62 is an example of an inquiry process.

The first operation is a user operation for indicating that the ink chamber 111 has been refilled with ink up to the maximum storage quantity and corresponds to pressing the [1] button, for example. The second operation is a user operation for indicating that the ink chamber 111 has been refilled with ink to less than its maximum storage quantity and corresponds to pressing the [2] button, for example. The third operation is a user operation for indicating that the ink chamber 111 has not been refilled and corresponds to pressing the [3] button, for example.

In this variation, in response to the pressing of the [1] button while the inquiry screen is displayed, the controller 130 sets the corresponding count value to the first initial value (S63). In response to the pressing of the [2] button while the inquiry screen is displayed, the controller 130 sets the corresponding count value to the second initial value (S64). In response to the pressing of the [3] button while the inquiry screen is displayed, the controller 130 does not initialize the corresponding count value.

In S65 the controller 130 determines whether the process in S61-S64 has been completed for all colors. While the process in S61-S64 has not been performed for all colors (S65: NO), in S66 the controller 130 sets the target color to the next color in the sequence M→C→Y→Bk. After the controller 130 has completed the process in S61-S64 for all the ink chambers 111 (S65: YES), the controller 130 ends the query process B-2.

This variation can obtain the same operational advantages of the variation described above through simpler user operations.

Figure 12:
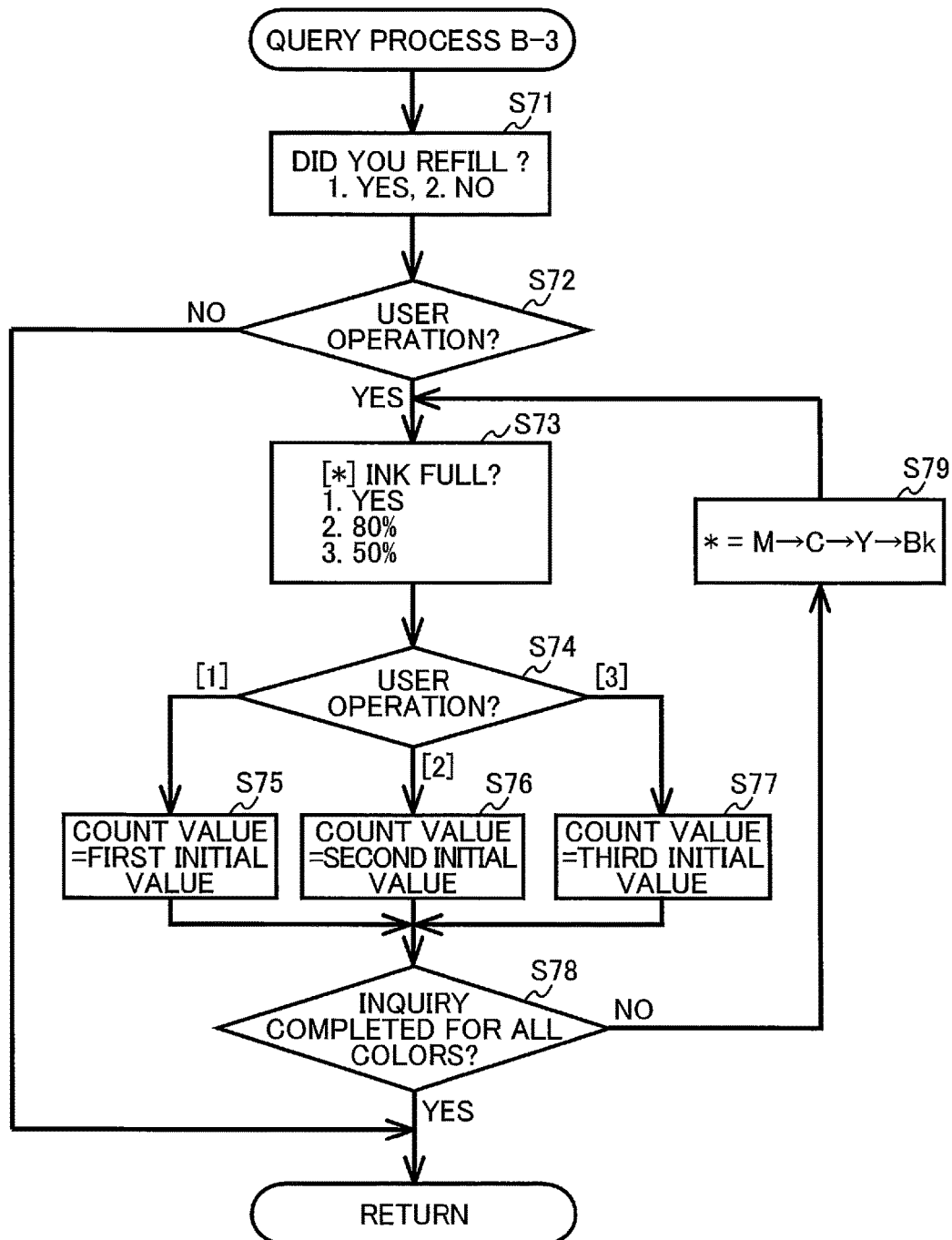
FIG. 12 is a flowchart illustrating steps in a query process B-3 performed by the controller 130 according to still another variation.

As still another variation, the controller 130 may perform a common preliminary inquiry process for all ink chambers 111 and may receive one of three or more operations through the inquiry process for each of the ink chambers 111. A query process B-3 according to this variation will be described while referring to FIG. 12.

The process in S71-S72 in the query process B-3 is equivalent to the process in S31-S32 in the query process B (i.e. preliminary inquiry process). Hence, the description on the process in S71-S72 will be omitted.

In S73 the controller 130 controls the display section 15 to display an inquiry screen on the display section 15 that targets the ink chamber 111M. This inquiry screen prompts the user to indicate whether the ink chamber 111M has been refilled with ink up to its maximum storage quantity. The controller 130 continuously displays the inquiry screen on the display section 15 until the controller 130 receives one of a first operation, a second operation, and a third operation through the operation section 17 (S74). The process in S73 and S74 is an example of an inquiry process.

In this variation, the first operation is a user operation for indicating that the ink chamber 111 has been refilled with ink up to the maximum storage quantity and corresponds to pressing the [1] button, for example. The second operation is a user operation for indicating that the ink chamber 111 has been refilled with ink to 80% the maximum storage quantity (an example of a first quantity) and corresponds to pressing the [2] button, for example. The third operation is a user operation for indicating that the ink chamber 111 has been refilled to 50% the maximum storage quantity (an example of a second quantity) and corresponds to pressing the [3] button, for example.

In response to the pressing of the [1] button while the inquiry screen is displayed, in S75 the controller 130 sets the corresponding count value to a first initial value (0). In response to the pressing of the [2] button while the inquiry screen is displayed, in S76 the controller 130 sets the corresponding count value to a second initial value (20). In response to the pressing of the [3] button while the inquiry screen is displayed, in S77 the controller 130 sets the corresponding count value to a third initial value (50). The third initial value is set to produce a difference between the first threshold value and the corresponding count value smaller than the difference produced with the second initial value. The process of setting the count value to the third initial value is an example of a third initialization process. By increasing the number of options in the inquiry process in this way, the controller 130 can initialize the ink quantity information more appropriately.

In S78 the controller 130 determines whether the process in S73-S77 has been completed for all colors. While the process in S73-S77 has not been performed for all colors (S78: NO), in S79 the controller 130 sets the target color to the next color in the sequence M→C→Y→Bk. After the controller 130 has completed the process in S73-S77 for all the ink chambers 111 (S78: YES), the controller 130 ends the query process B-3.

In the embodiment described above, the count values are initialized to different values in S36 and S41. However, initialization of the ink quantity information is not limited to the above examples. As another example, the controller 130 may set the count values to the same fixed initial value (0, for example) in both S36 and S41. Further, in S36 the controller 130 may set the first threshold value to a first initial value (95, for example), and may set the second threshold value to a first initial value (85, for example). In S41, on the other hand, the controller 130 may set the first threshold value to a second initial value (15, for example) and may set the second threshold value to a second initial value (5, for example).

The threshold time in S15 may be adjusted based on whether the ink chamber 111 is in the ink low state. In other words, the threshold time may be set longer for an ink chamber 111 in the ink low state than for an ink chamber 111 that is not in the ink low state. Further, the threshold time may be set to a longer time interval when the number of ink chambers 111 in the ink low state is greater, i.e., when there are the greater number of ink low flags set to "ON".

By adjusting the threshold time based on the difference between the second threshold value and the count value in this way, the controller 130 can determine more appropriately whether to perform the inquiry process. For example, the probability of the user refilling the ink chamber 111 with ink is higher when the difference between the second threshold value and the corresponding count value is smaller, and lower when the difference between the second threshold value and the corresponding count value is greater. Hence, the controller 130 can avoid unnecessary inquiry process by increasing the threshold time when the difference between the second threshold value and the count value is greater.

It is also possible that the user will refill multiple ink chambers 111 with ink after moving the cover 70 to the exposing position. In such cases, the length of time required to refill the ink chambers 111 with ink is likely greater when the number of ink chambers 111 in the ink low state is greater. Hence, adjusting the threshold time based on the number of ink low flags set to "ON" will improve the precision for inferring whether the ink chambers 111 have been refilled.

While the process in the embodiment described above performs both the process in S18 and the processes in S35 and S40, one of the process in S18 and the processes in S35 and S40 may be omitted. Further, while the present embodiment describes an example of skipping the process in S18 when one of the soft-empty flags Y, C, and M has been set to "ON", the controller 130 may instead skip the query process B when one of the soft-empty flags Y, C, and M has been set to "ON" and the ink chamber 111B is in the hard-empty state at the timing that the controller 130 performs S18. If the ink chamber 111B is in the hard-empty state at the timing that the controller 130 performs S18, then the ink chamber 111B has not been refilled even though the cover 70 has been opened and closed. In such cases, it is highly likely that the user has not refilled the other ink chambers 111Y, 111C, and 111M.

The present embodiment describes an example in which the ink detection portion 152 and the residual ink sensor 73 are only provided for the tank 100B. However, the ink detection portion 152 and the residual ink sensor 73 may be provided for each of the tanks 100B, 100Y, 100C, and 100M or for none of the tanks 100B, 100Y, 100C, and 100M. When the ink detection portions 152 and the residual ink sensors 73 are provided for all of the tanks 100B, 100Y, 100C, and 100M, the controller 130 may skip S17 and in S18 the controller 130 may determine the residual ink signals from the residual ink sensors 73 whose corresponding hard-empty flag and soft-empty flags Y, C, and M have been set to "ON", and in S25, S35, and S40 the controller 130 may determine the residual ink signals from the residual ink sensors 73 corresponding to the ink chambers 111 targeted in the corresponding processes S23-S26, S33-S36, and S39-S41. On the other hand, if the ink detection portion 152 and the residual ink sensor 73 are not provided for any of the ink chambers 111, the processes in S17, S18, S35, and S40 may be omitted.

In the embodiment described above, the controller 130 determines the settings for the hard-empty flag, the soft-empty flags Y, C, and M, and the ink low flags B, Y, C, and M in steps S13, S39, S51, and S58. However, the specific method of determination in S13, S39, S51, and S58 is not limited to the above example. For example, when the ink detection portion 152 and the residual ink sensor 73 are provided for each of the tanks 100B, 100Y, 100C, and 100M, in S13, S39, S51, and S58 the controller 130 may employ hard-empty flags Y, C, and M in place of the soft-empty flags Y, C, and M. However, when the ink detection portion 152 and the residual ink sensor 73 are not provided for any of the tanks 100B, 100Y, 100C, and 100M, in S13, S39, S51, and S58, the controller 130 may employ a soft-empty flag B in place of the hard-empty flag.

As another variation, rather than determining the settings of the flags in S13, S39, S51, and S58, the controller 130 may determine whether the ink chambers 111 are in the hard-empty state, the soft-empty state, or the ink low state. Specifically, in S13, S39, S51, and S58 the controller 130 may determine whether the difference between the count value and either the first threshold value or the second threshold value is greater than or equal to 0 for each of the ink chambers 111B, 111Y, 111C, and 111M. The controller 130 may also store in the RAM 133 the residual ink signal that has been outputted from the residual ink sensor 73 at the timing that the controller 130 detects the cover open event through the cover sensor 72. Subsequently, the controller 130 may determine in S13 whether the residual ink signal stored in the RAM 133 is the first residual ink signal (S13: OFF) or the second residual ink signal (S13: ON). Similarly, the controller 130 may determine in S51 whether the residual ink signal outputted from the residual ink sensor 73 is the first residual ink signal (S51: OFF) or the second residual ink signal (S51: ON).

While the description has been made in detail with reference to the embodiment(s) thereof, it would be apparent to those skilled in the art that many modifications and variations may be made therein without departing from the scope of the disclosure.

What is claimed is:

1. An inkjet recording apparatus comprising:
    a tank having a set of an ink chamber and an inlet, the ink chamber being configured to store ink therein, ink being injected into the ink chamber through the inlet;
    a recording head configured to eject the ink stored in the ink chamber to record an image on a sheet;
    a memory configured to store an ink quantity information, the ink quantity information including:
        a first threshold value; and
        a count value updated in a direction approaching the first threshold value to decrease a first difference between the first threshold value and the count value in accordance with ejection of the ink from the recording head, the first difference being obtained by subtracting one of the first threshold value and the count value from the other of the first threshold value and the count value, the first difference corresponding to a quantity of the ink stored in the ink chamber and being variable within a prescribed range;
    a display configured to display a screen;
    an operation interface configured to receive a user operation; and
    a controller configured to control the recording head and the display, the controller being configured to:
        perform an inference process to infer whether ink has been injected into the ink chamber through the inlet;
        perform, in response to the inference that ink has been injected into the ink chamber in the inference process, an inquiry process to display an inquiry screen on the display and to receive one of a plurality of operations through the operation interface, the plurality of operations including a first operation and a second operation, the inquiry screen inquiring whether ink has been injected into the ink chamber up to a maximum storage quantity thereof;
        perform, in response to the receipt of the first operation in the inquiry process, a first initialization process to set the ink quantity information to a first initial value with which the first difference becomes maximum within the prescribed range; and
        perform, in response to the receipt of the second operation in the inquiry process, a second initialization process to set the ink quantity information to a second initial value with which the first difference is smaller than the first difference with the first initial value.

2. The inkjet recording apparatus according to claim 1, wherein the recording head is configured to eject the ink stored in the ink chamber in a case where the quantity of the ink stored in the ink chamber is not less than a residual ink threshold and not to eject the ink stored in the ink chamber in a case where the quantity of the ink stored in the ink chamber is less than the residual ink threshold,
    wherein the controller is configured to further perform, in response to the inference in the inference process that ink has been injected into the ink chamber, a first determination process to determine whether the quantity of the ink stored in the ink chamber at a time immediately before performing the inference process is less than the residual ink threshold,
    wherein, after the determination in the first determination process that the quantity of the ink stored in the ink chamber at a time immediately before performing the inference process is less than the residual ink threshold, the controller is configured to perform, in response to the receipt of the second operation in the inquiry process, the second initialization process, and wherein, after the determination in the first determination process that the quantity of the ink stored in the ink chamber at a time immediately before performing the inference process is not less than the residual ink threshold, the controller is configured not to perform, in response to the receipt of the second operation in the inquiry process, the second initialization process.

3. The inkjet recording apparatus according to claim 2, further comprising a residual ink sensor configured to detect whether a level of the ink stored in the ink chamber is higher than or equal to a detection position,
    wherein the controller is configured to perform, in response to the determination in the first determination process that the quantity of the ink stored in the ink chamber at a time immediately before performing the inference process is less than the residual ink threshold and the detection through the residual ink sensor that the level of the ink stored in the ink chamber is higher than or equal to the detection position, the inquiry process, and
    wherein the controller is configured not to perform, in response to the determination in the first determination process that the quantity of the ink stored in the ink chamber at a time immediately before performing the inference process is less than the residual ink threshold and the detection through the residual ink sensor that the level of the ink stored in the ink chamber is not higher than or equal to the detection position, the inquiry process.

4. The inkjet recording apparatus according to claim 2, further comprising:
    a cover configured to be movable between a covering position covering the inlet to restrict ink from being injected into the ink chamber and an exposing position exposing the inlet to an outside to allow ink to be injected into the ink chamber; and a cover sensor configured to detect a position of the cover;

wherein the controller is configured to:

infer in the inference process that ink has been injected into the ink chamber in response to the detection through the cover sensor that the cover has been moved to the exposing position and then moved back to the covering position; and determine in the first determination process whether the quantity of the ink stored in the ink chamber at a time the cover is moved back to the exposing position is less than the residual ink threshold, wherein the controller is configured to further perform, in response to the determination in the first determination process that the quantity of the ink stored in the ink chamber at a time the cover is moved back to the exposing position is not less than the residual ink threshold, a second determination process to determine whether an exposing time during which the cover has been in the exposing position is not less than a threshold time, wherein the controller is configured to perform, in response to the determination in the second determination process that the exposing time during which the cover has been in the exposing position is not less than the threshold time, the inquiry process, and wherein the controller is configured not to perform, in response to the determination in the second determination process that the exposing time during which the cover has been in the exposing position is less than the threshold time, the inquiry process.

5. The inkjet recording apparatus according to claim 1, wherein the tank includes a plurality of the sets of an ink chamber and an inlet, wherein the memory is configured to store the ink quantity information for each of a plurality of ink chambers in the plurality of the sets, wherein the controller is configured to further perform, prior to performing the inquiry process, a preliminary inquiry process to display a preliminary inquiry screen on the display and to receive one of a third operation and a fourth operation through the operation interface, the preliminary inquiry screen inquiring whether ink has been injected into at least one of the plurality of ink chambers, wherein the controller is configured to perform, in response to the receipt of the third operation in the preliminary inquiry process, the inquiry process repeatedly for each of the plurality of ink chambers, wherein the controller is configured to set, in response to the receipt of the first operation in the inquiry process for a target ink chamber, the ink quantity information for the target ink chamber to the first initial value in the first initialization process, wherein the controller is configured to set, in response to the receipt of the second operation in the inquiry process for the target ink chamber, the ink quantity information for the target ink chamber to the second initial value in the second initialization process, and wherein the controller is configured not to perform, in response to the receipt of the fourth operation in the preliminary inquiry process, the inquiry process for all of the plurality of ink chambers.

6. The inkjet recording apparatus according to claim 1, wherein the tank includes a plurality of the sets of an ink chamber and an inlet, wherein the memory is configured to store the ink quantity information for each of a plurality of ink chambers in the plurality of the sets, wherein, for each of the plurality of ink chambers, the controller is configured to further perform a preliminary inquiry process to display a preliminary inquiry screen on the display and to receive one of a third operation and a fourth operation through the operation interface, the preliminary inquiry screen inquiring whether ink has been injected into the target ink chamber, wherein, for the each of the plurality of ink chambers, the controller is configured to perform the inquiry process, the preliminary inquiry process and the inquiry process being performed in sequence for each of the plurality of ink chambers, wherein the controller is configured to perform, in response to the receipt of the third operation in the preliminary inquiry process for the target ink chamber, the inquiry process for the target ink chamber, wherein the controller is configured to set, in response to the receipt of the first operation in the inquiry process for the target ink chamber, the ink quantity information for the target ink chamber to the first initial value in the first initialization process, wherein the controller is configured to set, in response to the receipt of the second operation in the inquiry process for the target ink chamber, the ink quantity information for the target ink chamber to the second initial value in the second initialization process, and wherein the controller is configured not to update, in response to the receipt of the fourth operation in the preliminary inquiry process for the target ink chamber, the ink quantity information for the target ink chamber.

7. The inkjet recording apparatus according to claim 1, wherein the plurality of operations further includes a third operation, wherein the inquiry screen inquiring whether ink has been injected into the ink chamber up to a maximum storage quantity thereof, ink has been injected into the ink chamber but not up to the maximum storage quantity thereof, or no ink has been injected into the ink chamber, wherein the first operation is an operation for indicating that ink has been injected into the ink chamber up to the maximum storage quantity thereof, the second operation is an operation for indicating that ink has been injected into the ink chamber but not up to the maximum storage quantity thereof, and the third operation is an operation for indicating that no ink has been injected into the ink chamber, and wherein the controller is configured not to update, in response to the receipt of the third operation in the inquiry process, the ink quantity information.

8. The inkjet recording apparatus according to claim 5, wherein the controller is configured to further perform, in response to the receipt of the second operation in the inquiry process, a third determination process to determine whether the quantity of the ink stored in the target ink chamber at a time immediately before performing the inference process is less than the residual ink threshold, wherein the controller is configured to perform, in response to the determination in the third determination process that the quantity of the ink stored in the target ink chamber at a time immediately before performing the inference process is less than the residual ink threshold, the second initialization process for the target ink chamber, and wherein the controller is configured not to perform, in response to the determination in the third determination process that the quantity of the ink stored in the target ink chamber at a time immediately before performing the inference process is not less than the residual ink threshold, the second initialization process for the target ink chamber.

9. The inkjet recording apparatus according to claim 1, wherein the plurality of operations further includes a third operation, wherein the inquiry screen inquiring whether ink has been injected into the ink chamber up to a maximum storage quantity thereof, or to a first quantity smaller than the maximum storage quantity, or to a second quantity smaller than the first quantity, wherein the first operation is an operation for indicating that ink has been injected into the ink chamber up to the maximum storage quantity thereof, the second operation is an operation for indicating that ink has been injected into the ink chamber to the first quantity, and the third operation is an operation for indicating that ink has been injected into the ink chamber to the second quantity, and wherein the controller is configured to further perform, in response to the receipt of the third operation in the inquiry process, a third initialization process to set the ink quantity information to a third initial value with which the first difference is smaller than the first difference with the second initial value.

10. The inkjet recording apparatus according to claim 1, wherein the ink quantity information further includes a second threshold value, a second difference between the second threshold value and the count value being obtained by subtracting the second threshold value from the count value in a case where the first difference is obtained by subtracting the first threshold value from the count value and by subtracting the count value from the second threshold value in a case where the first difference is obtained by subtracting the count value from the first threshold value, the second difference reaching zero before the first difference reaches zero, wherein the controller is configured to further:

perform a fourth determination process to determine whether the second difference is less than zero; and perform, in response to the determination in the fourth determination process that the second difference is less than zero, a notification process to display a notification screen on the display, the notification screen notifying that ink needs to be injected into the ink chamber, and wherein the second difference is greater than zero when the ink quantity information is set to the second initial value.

11. The inkjet recording apparatus according to claim 1, wherein the controller is configured to further:

receive a recording instruction to record an image on a sheet;

perform, in response to the receipt of the recording instruction, a fifth determination process to determine whether the quantity of the ink stored in the ink chamber is less than a residual ink threshold;

perform, in response to the determination in the fifth determination process that the quantity of the ink stored in the ink chamber is not less than the residual ink threshold, a recording process to control the recording head to record an image on a sheet;

perform an updating process to update the count value based on the quantity of the ink ejected from the recording head in the recording process; and perform, in response to the determination in the fifth determination process that the quantity of the ink stored in the ink chamber is less than the residual ink threshold, a notification process to display a notification screen on the display without performing the recording process and the updating process, the notification screen notifying that an image cannot be recorded until ink is injected into the ink chamber.

12. The inkjet recording apparatus according to claim 1, wherein the tank has an outer surface, at least a part of the outer surface allowing the ink stored in the ink chamber to be visible from an outside of the tank.

13. The inkjet recording apparatus according to claim 1, wherein the plurality of operations further includes a third operation, and wherein the controller is configured not to update, in response to the receipt of the third operation in the inquiry process, the ink quantity information.

14. The inkjet recording apparatus according to claim 1, wherein the plurality of operations further includes a third operation, and wherein the controller is configured to further perform, in response to the receipt of the third operation in the inquiry process, a third initialization process to set the ink quantity information to a third initial value with which the first difference is smaller than the first difference with the second initial value.

* * * * *